US010363699B2

(12) United States Patent
Kharchenko et al.

(10) Patent No.: US 10,363,699 B2
(45) Date of Patent: Jul. 30, 2019

(54) METHOD OF FORMING AND SETTING HEADSPACE WITHIN A CONTAINER

(71) Applicant: DISCMA AG, Hunenberg (CH)

(72) Inventors: Semen Kharchenko, Ann Arbor, MI (US); Pankaj Kumar, Dexter, MI (US); Fred C. Beuerle, Jackson, MI (US)

(73) Assignee: DISCMA AG, Zürich (CH)

( * ) Notice: Subject to any disclaimer, the term of this patent is extended or adjusted under 35 U.S.C. 154(b) by 271 days.

(21) Appl. No.: 15/124,938

(22) PCT Filed: Mar. 9, 2015

(86) PCT No.: PCT/IB2015/000769
§ 371 (c)(1),
(2) Date: Sep. 9, 2016

(87) PCT Pub. No.: WO2015/136369
PCT Pub. Date: Sep. 17, 2015

(65) Prior Publication Data
US 2017/0021553 A1 Jan. 26, 2017

(30) Foreign Application Priority Data

Mar. 10, 2014 (WO) ................ PCT/US2014/022517

(51) Int. Cl.
*B65B 3/12* (2006.01)
*B65B 3/02* (2006.01)
(Continued)

(52) U.S. Cl.
CPC .............. *B29C 49/46* (2013.01); *B29C 49/12* (2013.01); *B29C 49/4273* (2013.01);
(Continued)

(58) Field of Classification Search
CPC .... B29C 2049/1238; B29C 2049/4294; B29C 49/06; B29C 49/12
See application file for complete search history.

(56) References Cited

U.S. PATENT DOCUMENTS 4,437,825 A 3/1984 Harry et al.
2011/0260373 A1* 10/2011 Finger .................... B29C 49/12
264/532

(Continued)

FOREIGN PATENT DOCUMENTS

EP 0428394 5/1991
EP 1314535 5/2003
(Continued)

*Primary Examiner* — Alexander M Weddle
(74) *Attorney, Agent, or Firm* — Eric J. Sosenko; Jonathan P. O'Brien; Honigman LLP

(57) ABSTRACT

A method for forming and filling a container with liquid. The container being formed from a preform located within a mold and the method utilizing a hydraulic blow molding device that is coupled to a source of the liquid, which is used as the blow molding medium. The hydraulic blow molding device has a blow nozzle and a member that is extended from a retracted position to a position within the preform. A blow nozzle engages in fluid tight communication with an open end of the preform so as to provide a sealing engagement of the blow nozzle with the preform. The liquid blow medium is injected into the preform so as to form the container after sealing engagement of the blow nozzle with the preform. The member initiates its advancement into the preform prior to the time of sealing engagement of the blow nozzle with the preform.

31 Claims, 15 Drawing Sheets

(51) Int. Cl.
  *B29C 49/46* (2006.01)
  *B29C 49/12* (2006.01)
  *B29C 49/58* (2006.01)
  *B29C 49/78* (2006.01)
  *B65B 3/30* (2006.01)
  *B29C 49/42* (2006.01)
  *B65B 39/00* (2006.01)
  *B29K 23/00* (2006.01)
  *B29K 25/00* (2006.01)
  *B29K 27/06* (2006.01)
  *B29K 55/02* (2006.01)
  *B29K 67/00* (2006.01)
  *B29C 49/06* (2006.01)
  *B29L 31/00* (2006.01)

(52) U.S. Cl.
  CPC ............ *B29C 49/58* (2013.01); *B29C 49/783* (2013.01); *B65B 3/022* (2013.01); *B65B 3/12* (2013.01); *B65B 3/30* (2013.01); *B65B 39/00* (2013.01); *B29C 49/06* (2013.01); *B29C 2049/129* (2013.01); *B29C 2049/1238* (2013.01); *B29C 2049/1257* (2013.01); *B29C 2049/1295* (2013.01); *B29C 2049/4294* (2013.01); *B29C 2049/4602* (2013.01); *B29C 2049/4664* (2013.01); *B29C 2049/5865* (2013.01); *B29C 2049/5875* (2013.01); *B29C 2049/5879* (2013.01); *B29K 2023/065* (2013.01); *B29K 2023/0633* (2013.01); *B29K 2023/08* (2013.01); *B29K 2023/10* (2013.01); *B29K 2025/06* (2013.01); *B29K 2027/06* (2013.01); *B29K 2055/02* (2013.01); *B29K 2067/003* (2013.01); *B29L 2031/712* (2013.01)

(56) References Cited

U.S. PATENT DOCUMENTS

2012/0299224 A1* 11/2012 Cooper .................. B29C 49/12
    264/524
2012/0315348 A1* 12/2012 Wilson .................. B29C 49/46
    425/149
2014/0356475 A1* 12/2014 Sato ........................ B29C 49/06
    425/524

FOREIGN PATENT DOCUMENTS

| EP | 2366528 | 9/2011 | | |
| EP | 1574318 | 9/2015 | | |
| WO | 2009/075791 | 6/2009 | | |
| WO | WO-2013114796 A1 * | 8/2013 | ............ | B29C 49/06 |
| WO | 2014/020042 | 2/2014 | | |

* cited by examiner

METHOD OF FORMING AND SETTING HEADSPACE WITHIN A CONTAINER

CROSS-REFERENCE TO RELATED APPLICATIONS

This application is the US national phase of PCT application no. PCT/IB2015/000769 filed on Mar. 9, 2015, which claims priority to PCT/US2014/022517 filed on Mar. 10, 2014, the disclosures of which are incorporated in their entirety by reference herein.

BACKGROUND

1. Field of the Invention

Generally, the present invention relates to hydraulic blow molding of a container from a preform, wherein the end product, a liquid, is used as the blow molding medium. More specifically, the present invention relates to a method of forming a container from a preform, filling the container with liquid and setting the headspace of the liquid in the resultant container.

2. Description of Related Art

Plastic containers for liquid products are manufactured by various different methods. In several methods, a plastic preform is heated to a suitable temperature for molding, placed within a mold and then expanded axially and radially to form the container. In certain processes, air is used as a blow medium to axially and radially expand the preform and form the container. This process is generally referred to as blow molding. After the container is formed with air, it is filled with its liquid product, either at a secondary site or a filling line integrated with the blow molding line. In a newer process, the liquid product is actually used as the blow medium for forming the container. This latter process, using a liquid blow medium, is herein referred to as hydraulic blow molding.

When the end product is a sensitive product like fruit juice or the like, it is important to reduce the quantity of oxygen included in the liquid. In traditional filling processes, liquid drops into the formed container without contact between the filling nozzle and the neck of the formed container. The inner volume of the container is often in communication with the outside atmosphere. So, while the liquid progressively fills the container, it simultaneously evacuates air previously inside the container. In hydraulic blow molding processes, the container is formed while liquid enters under pressure in the heated preform. So the inner volume of the preform is tightly closed to avoid liquid spillage. When the liquid starts entering into the heated preform, air inside the preform cannot escape out of the preform and is mixed with the liquid. One may desire reducing the quantity of oxygen or of air mixed with the liquid, in particular, but not limited to forming and filling container with sensitive end product.

Another important consideration relative to the hydraulic blow molding process is how to effectively set the headspace and desired fill level of liquid within the container. One current approach utilizes a stretch rod to set the headspace/fill level. Such a process is generally mentioned in U.S. Pat. No. 8,017,064. In this approach, the stretch rod is retracted from a fully extended position to a headspace setting position and the system, which includes the pressure within the formed container, is depressurized. Once the stretch rod is in the headspace setting position and the system depressurized, the seal pin is closed to prevent additional liquid from entering the container. The stretch rod is then further retracted to ensure that the level of the liquid within the container immediately drops when the nozzle disengages from the container, thereby preventing spillage of the liquid. A drawback of such process may be that the full system, including the pressure source, the injection nozzle and the formed container has to be depressurized before closing the seal pin. Such a reduction in pressure takes time, and that time is not used for forming the container. In some applications of the hydraulic blow molding process, one may desire reducing the cycle time and increasing the machine throughput.

Another drawback may be that the further retraction of the stretch rod reduces the volume within the container and thereby induces a negative pressure within the container. This negative pressure causes the sidewall of the container to deform inwardly. If this deformation is severe enough, greater than about a 7% volume reduction, the deformation of the container may become permanent, resulting in a container that is aesthetically undesirable and, typically, not purchased by an end consumer.

SUMMARY

In view of the above, a method is provided for mitigating at least one of the above drawbacks. According to an embodiment of one aspect of the invention, the method for forming and filling a container with liquid uses a container being formed from a preform located within a mold and utilizes a hydraulic blow molding device that is coupled to a source of the liquid, which is used as the blow molding medium, the hydraulic blow molding device having a blow nozzle and a member. The method comprises: extending the member from a retracted position to a position within the preform; engaging the blow nozzle in fluid tight communication with an open end of the preform to provide a sealing engagement of the blow nozzle with the preform; injecting the liquid blow medium into the preform so as to form the container after the sealing engagement of the blow nozzle with the preform; wherein the member has initiated its advancement into the preform prior to the time of sealing engagement of the blow nozzle with the preform.

With advancement of a member into the preform prior to the sealing engagement of the blow nozzle with the preform, a volume of air equivalent to the volume of the member entered into the preform is allowed to be evacuated from the interior of the preform. After such evacuation of air, said sealing engagement closes the inner volume of the preform and allows liquid to enter under pressure inside the preform. This reduces or almost avoids air being mixed with the liquid inside the formed container.

Advantageously, the method comprises extending the member from the retracted position to an engagement position where the member engages a closed end of the preform.

Advantageously, the volume of the member into the preform at the time of sealing engagement of the blow nozzle with the preform is greater than 40% of the inner volume of the preform, preferably greater than 60% of the inner volume of the preform, more preferably greater than 80% of the inner volume of the preform.

According to another embodiment following said aspect, the member is a stretch rod, the method further comprising the step of axially stretching the preform by extending the stretch rod.

In particular, the above embodiment of the method includes extending the stretch rod from the retracted position to a position wherein the stretch rod stretches the preform before the time of sealing engagement of the blow nozzle with the preform.

According to another embodiment following said aspect, the hydraulic blow molding device used for the method includes a seal pin. The method further comprises opening the seal pin at the beginning of said injecting the liquid blow medium into the preform so as to form the container and/or closing the seal pin at the end of said injecting the liquid blow medium into the preform so as to form the container.

The above embodiment of the method may use a member being a headspace setting member. The method further includes, after closing the seal pin, retracting the headspace setting member from a first headspace setting position to a second headspace setting position, the second headspace setting position being closer to the finish than the first headspace setting position.

According to another aspect of the invention, an embodiment of the method provides for forming and filling a container with liquid and setting the headspace of the liquid within the container, the container being formed from a preform located within a mold and the method utilizing a hydraulic blow molding device that is coupled to a source of a pressurized liquid blow medium, the hydraulic blow molding device having an injection nozzle and a headspace setting member, the method comprising: engaging the injection nozzle in fluid tight engagement with an open end of the preform; extending the headspace setting member from a retracted position to a position within the preform; injecting the pressurized liquid blow medium into the preform so as to form the container; positioning the headspace setting member at a first headspace position within the container; establishing a closing pressure of the liquid blow medium inside the formed container that is independent from the pressure of the source of pressurized liquid blow medium; breaking the fluid tight engagement by disengaging the injection nozzle from the preform while the pressure inside the container is still independent from the pressure of the source of pressurized liquid blow medium thereby providing a predetermined final fill level of the liquid within the container; the closing pressure being different from the ambient pressure and is above the ambient pressure and the method further comprises that after establishing the closing pressure inside the container and before breaking the fluid tight engagement, exerting a force on the headspace setting member to reduce the pressure of the liquid blow medium inside the container from the closing pressure to a disengaging pressure that is one of a pressure lower than ambient pressure or a pressure equal to ambient pressure.

Advantageously, the hydraulic blow molding device further have a seal pin, said establishing a closing pressure of the liquid blow medium inside the formed container that is independent from the pressure of the pressurized liquid source is made by closing the seal pin while the liquid blow medium is at the closing pressure, and/or the pressure inside the container is still independent from the pressure of the pressurized liquid source when the seal pin is still closed.

According to another embodiment of a second aspect of the invention, an embodiment of the method provides for forming and filling a container with liquid and setting the headspace of the liquid within the container, the container being formed from a preform located within a mold and the method utilizing a hydraulic blow molding device that is coupled to a source of a pressurized liquid blow medium, the hydraulic blow molding device having an injection nozzle, and a pressurized liquid source, the method comprising: engaging the injection nozzle in fluid tight engagement with an open end of the preform; injecting the liquid blow medium into the preform so as to form the container; establishing a closing pressure of the liquid blow medium inside the formed container that is independent from the pressure of the source of pressurized liquid blow medium; breaking the fluid tight engagement by disengaging the injection nozzle from the preform while the pressure inside the container is still independent from the pressure of the source of pressurized liquid blow medium thereby providing a predetermined final fill level of the liquid within the container; the closing pressure being different from the ambient pressure and is above the ambient pressure and the method further comprises that after establishing the closing pressure inside the container and before breaking the fluid tight engagement, reducing the pressure of the liquid blow medium inside the formed container from the closing pressure to a disengaging pressure that is one of a pressure lower than ambient pressure or a pressure equal to ambient pressure, said reducing the pressure taking place while said the pressure of the liquid blow medium inside the formed container is still independent from the pressure of the source of pressurized liquid blow medium.

Advantageously, the hydraulic blow molding device further have a headspace setting member, said reducing the pressure of the liquid blow medium inside the formed container is made by exerting a force on the headspace setting member. Preferably, said reducing the pressure of the liquid blow medium inside the formed container may be made by: positioning the headspace setting member at a first headspace position within the container prior said establishing a closing pressure of the liquid blow medium inside the formed container that is independent from the pressure of the pressurized liquid source; and by extending the headspace setting member from a retracted position to a position within the preform while the pressure inside the container is still independent from the pressure of the pressurized liquid source.

Advantageously, the hydraulic blow molding device further have a seal pin, said establishing a closing pressure of the liquid blow medium inside the formed container that is independent from the pressure of the source of pressurized liquid blow medium is made by closing the seal pin while the liquid blow medium is at the closing pressure, and/or the pressure inside the container is still independent from the pressure of the source of pressurized liquid blow medium when the seal pin is still closed.

According to another embodiment of a second aspect of the invention, the method for forming and filling a container with liquid and setting the headspace of the liquid within the container uses a preform located within a mold and utilizes a hydraulic blow molding device that is coupled to a source of a liquid blow medium, the hydraulic blow molding device having an injection nozzle, a headspace setting member and a seal pin. The method comprises: engaging the injection nozzle in fluid tight engagement with an open end of the preform; extending the headspace setting member from a retracted position to a position within the preform; injecting the liquid blow medium into the preform so as to form the container; positioning the headspace setting member at a first headspace position within the container; closing the seal pin while at liquid blow medium is at a closing pressure; breaking the fluid tight engagement by disengaging the injection nozzle from the preform while the seal pin is still closed thereby providing a predetermined final fill level of the liquid within the container, characterized in that the closing pressure is above or greater than the ambient pressure and the method further comprises that after closing of the seal pin and before breaking the fluid tight engagement, exerting a force on the headspace setting member to reduce the pressure of the liquid blow medium inside the container from the closing pressure to a disengaging pressure that is negative. Closing the seal pin when the pressure in the container and injection nozzle is still at a pressure above the ambient pressure allows for separate control over the pressures in the injection nozzle and in the container. This further allows for the reduction of pressure to the disengaging pressure, which is provided by the headspace setting member within the container, to be faster than the depressurization of the whole system.

According to other embodiments of the second aspect of the invention, the method includes at least one of the following features:

the exerting of a force on the headspace setting member includes retracting the headspace setting member from a first headspace setting position to a second headspace setting position, the second headspace setting position being closer to the finish than the first headspace setting position; Preferably, the volume occupied by the headspace setting member moving from the first headspace setting position to the second headspace setting position passes through an equilibrium position wherein the pressure inside the container is equal to the ambient pressure, and wherein the difference in volume occupied by the headspace setting member in the equilibrium position and in the second headspace setting position is greater than or equal to the volume of liquid existing between closed seal pin and lowermost extend of the preform finish; This ensures that any drops of liquid on the bottom of the injection nozzle, which would generally be located between the closed seal pin and the finish when the injection nozzle disengages from the preform, will be drawn down into the preform when the injection nozzle disengages from the preform;

the breaking of the fluid tight engagement occurs immediately after on-set of the disengaging pressure; This embodiment of the method could be provided for mitigating possible permanent deformation of a hydraulic blow molded container, while also setting the headspace and final fill level of the container; This is achieved by synchronizing the breaking of the fluid tight seal between the container and the nozzle with early onset of negative pressure within the container; While specific embodiments are shown and described herein, it is noted that the various features and elements of a particular embodiment are not strictly intended to be limited to that embodiment; Thus, features or elements of one embodiment are to be considered as individually applicable and adaptable to all other embodiments, unless expressly designated otherwise;

breaking of the fluid tight engagement occurs less than 0.5 seconds after on-set of the disengaging pressure, preferably less than 0.2 seconds after on-set of the disengaging pressure, particularly less than 0.1 seconds after on-set of the disengaging pressure, more particularly less than 0.05 seconds after on-set of the disengaging pressure;

the closing pressure is more than 0.3 bar above ambient pressure;

the step of injecting the liquid blow medium includes increasing pressure within the hydraulic blow molding device up to a peak pressure then reducing the pressure to the closing pressure that is greater than the disengaging pressure;

the step of injecting the liquid blow medium includes increasing pressure within the container up to a peak pressure then reducing the pressure to a holding pressure that is positive or above ambient pressure;

the step of positioning the headspace setting member at the first headspace setting position is performed while the container is at the holding pressure or while the container is transitioning from the peak pressure to the holding pressure;

the closing pressure is equal to the holding pressure;

the step of injecting the liquid blow medium into the preform is initiated by opening the seal pin; Preferably, the step of extending the headspace setting member from a retracted position to a position within the preform is conducted prior to opening of the seal pin, the position within the preform being an engagement position where the headspace setting member engages a closed end of the preform;

the method further comprises the step of axially stretching the preform by extending the headspace setting member;

the headspace setting member is a stretch rod;

the step of injecting the liquid blow medium into the preform is initiated by opening the seal pin; Preferably, the step of extending the headspace setting member from a retracted position to a position within the preform is conducted prior to opening of the seal pin, the position within the preform being an engagement position where the headspace setting member engages a closed end of the preform; the step of axially stretching the preform by extending the headspace setting member, wherein the step of axially stretching the preform includes extending the preform from the engagement position to a fully extended position corresponding to a bottom surface of the container; Preferably, the first headspace setting position is closer to the opening of the container than to the bottom surface of the container;

the step of injecting the liquid blow medium into the preform is initiated by opening the seal pin; Preferably, the step of extending the headspace setting member from a retracted position to a position within the preform is conducted prior to opening of the seal pin, the position within the preform being an engagement position where the headspace setting member engages a closed end of the preform, wherein the first headspace setting position is closer to the opening of the container than the engagement position;

the step of positioning the headspace setting member at the first headspace setting position is performed before the closing of the seal pin;

said engaging the injection nozzle in fluid tight engagement takes place while the seal pin is closed.

In one embodiment of the present invention, a method is provided for forming and filling a container with liquid and setting the headspace of the liquid within the container. The container is formed from a preform that is located within a mold, and the method utilizes a hydraulic blow molding device that is coupled to a source of a liquid blow medium. The hydraulic blow molding device includes an injection nozzle, a headspace setting member and a seal pin. The method comprising the steps of: engaging the injection nozzle in fluid tight engagement with an open end of the preform; extending the headspace setting member from a retracted position to a position within the preform; injecting the liquid blow medium into the preform so as to form the container; positioning the headspace setting member at a first headspace position within the container; closing the seal pin while the liquid blow medium is at a closing pressure; breaking the fluid tight engagement by disengaging the injection nozzle from the preform while the seal pin is still closed, thereby providing a predetermined final fill level of the liquid within the container; characterized in that the method further comprises that after closing of the seal pin and before breaking the fluid tight engagement, exerting a force on the headspace setting member to reduce the pressure of the liquid blow medium inside the container from the closing pressure to a disengaging pressure that is negative, and breaking of the fluid tight engagement occurs immediately after on-set of the disengaging pressure.

With the present invention, the magnitude of the negative pressure at which injection nozzle disengages from fluid tight engagement with the container is reduced. It is reduced by increasing the retained pressure within the formed container when the seal pin is closed. This reduces the possibility of permanent deformation to the container and also allows for a shortening of the cycle time, the latter by virtue of earlier closing of the seal pin and earlier disengagement of the injection nozzle.

In another embodiment, the exerting of a force on the headspace setting member includes retracting the headspace setting member from a first headspace setting position to a second headspace setting position, the second headspace setting position being closer to the finish than the first headspace setting position. The exerting of force on the headspace setting member immediately translates into a reduction of the pressure with the container.

In a further embodiment, the disengaging pressure is below ambient pressure or at a negative pressure. Being below ambient or at a negative pressure avoids having the liquid blow medium from being expelled from the container when the injection nozzle disengages from the container.

In an additional embodiment, the pressure of the liquid blow medium is increased up to a peak pressure then reduced to a holding pressure, the latter of which is greater than the disengaging pressure. In yet another aspect, the step of injecting the liquid blow medium includes increasing pressure within the container up to a peak pressure then reducing the pressure to a holding pressure that is greater than the disengaging pressure. By increasing the pressure to a peak pressure, the container is ensured to be fully formed and by reducing to a closing or holding pressure, less force is required to maintain the seal pin in its closed position.

In still a further embodiment, the positioning of the headspace setting member at the first headspace setting position is performed while the container is at the holding pressure. In yet a further aspect, the positioning of the headspace setting member at the first headspace setting position is performed while the container is transitioning from the peak pressure to the holding pressure. By positioning the headspace setting member at lower pressures, less force is required to maintain the seal pin in its closed position.

In an additional embodiment, the extending the headspace setting member from a retracted position to a position within the preform is conducted prior to the opening of the seal pin, the position within the preform being an engagement position where the headspace setting member engages a closed end of the preform. With this positioning of the headspace setting member, the preform is effectively centered within the cavity of the mold during axial stretching.

In another embodiment, the method includes the step of axially stretching the preform by extending the headspace setting member. The headspace setting member may therefore be a stretch rod. The headspace setting member therefore serves the dual role stretching the preform and setting the headspace.

In an additional embodiment, the step of axially stretching the preform includes extending the preform from the engagement position to a fully extended position corresponding to the bottom of the container. By fully stretching the preform, the preform is impinged on the bottom surface of the mold and remains centered during the entire molding process.

In yet another embodiment, the first headspace setting position is closer to the opening of the container than to the bottom position. Moving the headspace setting member to the first headspace setting position reduces the volume occupied by the headspace setting member and sets the proper volume for the headspace in the container.

In still a further embodiment, the first headspace setting position is closer to the opening of the container than the engagement position. The first headspace setting position reduces the volume of liquid blow medium displaced by the headspace setting member and sets the proper volume of the headspace in the resulting container.

In an additional embodiment, the step of positioning the stretch rod at the first headspace setting position is performed before the closing of the seal pin. Closing the seal pin after the headspace member is positioned allows for proper setting of the headspace volume.

Further objects, features and advantages of this invention will become readily apparent to persons skilled in the art after a review of the following description, with reference to the drawings and claims that are appended to and form a part of this specification.

DETAILED DESCRIPTION

Figure 1:
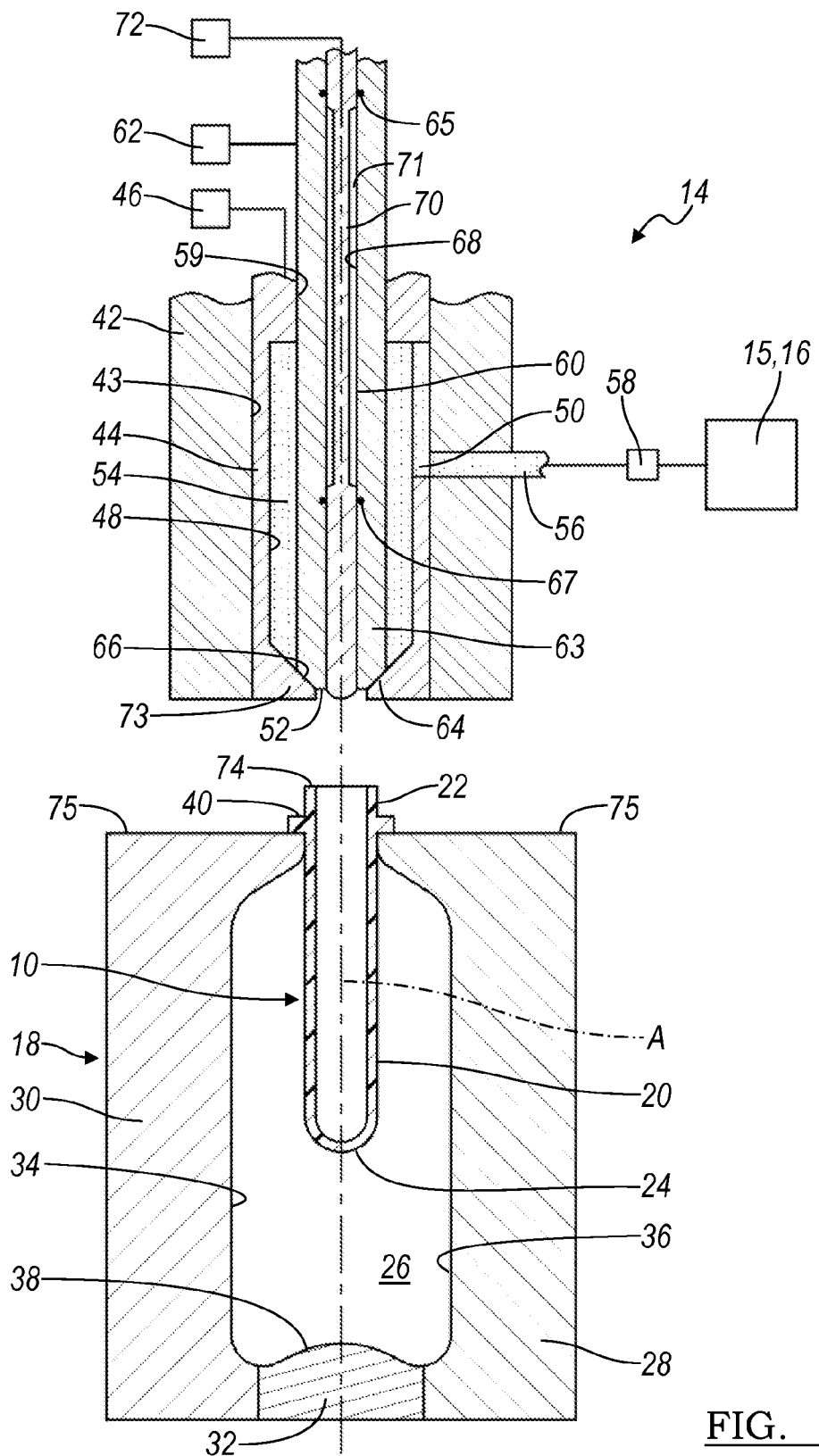
FIG. 1-3 are schematic illustrations of a hydraulic blow molding device, a mold and a preform carried within the mold used for the method according to a first aspect of the invention.

The present invention relates to a process for hydraulic blow molding a preform 10 into a container 12. The hydraulic blow molding process is performed by a hydraulic blow molding device 14 that is coupled to a source 15 of blow molding medium 16. In hydraulic blow molding, the blow molding medium 16 is a liquid and is also the end product contained in the filled container 12.

As used herein, the term "liquid" is intended to encompass non-gas, flowable mediums. The liquid may therefore have a low viscosity (like water or alcohol), a medium viscosity (like edible oil or soup) or a high viscosity (like ketchup or yogurt). Also, the liquid may be homogeneous or non-homogeneous and is not intended to be limited to foodstuff. Non-limiting illustrative examples of liquids that may be utilized with the present invention include cleansing products (for body, house or automotive care), medical fluids, industrial fluids, automotive fluids, and agricultural fluids. Hereafter, the blow molding medium 16 is accordingly referred to as the "liquid blow medium 16."

The preform 10 has a hollow body 20 extending from an open neck or finish 22, generally along a central axis A, to a closed end 24. As a result, the preform 10 may be described as having a shape similar to a test tube. While the body 20 of the preform 10 is elongated and expanded during forming of the container 12, the finish 22 is provided in its final form and may include threads (not shown) for engagement with corresponding threads of a closure cap (also not shown). Preforms 10 are generally formed by an injection molding process and may be made of any suitable plastic material, such as polyesters including polyethylene terephthalate (PET), polyethylene naphthalate (PEN), and polyethylene imine (PEI), polyolefins including low and high density polyethylene (LDPE and HDPE, respectively) and polypropylene (PP), styrene based materials including polystyrene (PS), acrylonitrile butadiene styrene (ABS) or other polymers including polyvinyl chloride (PVC). The above listing of materials is for illustrative purposes only and is not intended to limit the scope of the invention or the materials with which the method may be practiced.

The preform 10 is received within a cavity 26 of a mold 18. The cavity 26 is cooperatively defined by interior surfaces of at least two mold parts, such as mold halves 28, 30. Interior surfaces of a base mold 32 may also cooperatively define the cavity 26, particularly when the base of the container 12 is desired to have an upwardly doomed configuration. The mold halves 28, 30 are hinged together and movable in rotation relative to each other about an axis substantially parallel to the axis A defined by the preform 10. In this way, when the molds 28, 30 are rotated away from one another or opened, the preform 10 may be inserted into the cavity 26 and/or the container 12 removed therefrom, depending on the stage of the process. The base mold 32 moves axially along the axis A, advancing into the cavity 32 during molding of the container 12 and retracting from the cavity 32 permitting removal of the container 12. In the figures, the mold halves 28, 30 are shown in their closed position and the base mold 32 is shown in its advanced position. The illustrated positions represent the molding positions of these components.

As suggested above, the cavity 26 substantially defines the final shape of the container 12. In this regard, the cavity 26 includes cylindrical sidewalls 34, 36 and a bottom surface 37 that is domed. The upper portion of the cavity 26 is complementary to the part of the preform 10 that is located just below a support ring 40 of the finish 22. In this way, the mold halves 28, 30 hold the preform 10 just below the support ring 40 of the finish 22.

The hydraulic blow molding (HBM) device 14 includes a housing 42 having a central bore 43. Received within the housing 42 and axially moveable within the central bore 43 is an injection nozzle 44. Movement of the injection nozzle 44 is between a retracted position, seen in FIGS. 4 and 13, and an extended position, seen in FIGS. 5-12. To effectuate movement of the injection nozzle 44, the injection nozzle 44 is coupled to an actuator 46. The actuator 46 may be any well-known variety of actuator utilized in connection with the molding of plastic containers. Such actuators are often pneumatically driven, but may be driven by other means including, without limitation, electric motors, servomotors, magnetic or other means.

The injection nozzle 44 has a central passageway 48 defined through its interior and which is comprised of an inlet 50, an outlet 52 and a chamber 54, the latter of which joins the inlet 52 in fluid communication with the outlet 52. The inlet 50 is further coupled to the source 15 of the liquid blow medium 16 by a conduit 56. To provide the liquid blow medium 16 to the HBM device 14, a pressurization device 58 may be provided along the conduit 56. The pressurization device 58 is preferably one of the well-known devices used for providing pressurized fluids during the molding and filling of containers. Such devices include, without limitation, pressure pumps, pistons, servomotors and other appropriate devices.

The HBM device 14 further includes a seal pin 60 extending through a bore 59 in one end of the injection nozzle 44 and within the chamber 54. The seal pin 60 is movable within the chamber 54 generally along the previously mentioned axis (A). Similarly to movement of the injection nozzle 44, movement of the seal pin 60 is effectuated by an actuator 62 of one of the aforementioned varieties. The distal end of the seal pin 60 includes a head 63 having surfaces defining a sealing ring 64. The sealing ring 64 engages a sealing seat 66 provided on the injection nozzle 44 and located adjacent to the outlet 52. As seen in the figures, the sealing ring 64 and sealing seat 66 have complementary, conical shapes that, when engaged, seal the chamber 54 and prevent the liquid blow medium 16 from flowing through the outlet 52. The shape of the sealing ring 64 and sealing seat 66 may be other shapes than conical, so long as the engagement between the two components prevents the liquid blow medium 16 from flowing through the outlet 52.

The seal pin 60 further includes portions defining a central passageway 68 within which a member 70 is located. The member 70 is extendable, by an actuator 72 (similarly to the previously mentioned actuators 46, 42). The member 70 may extend out of the seal pin 60, through the outlet 52 of the injection nozzle 44 and into the body 20 of the preform 10. The member 70 has a rod shape with one or more grooves 71 extending axially along an intermediate axial portion of the member. The central passageway 68 of the seal pin 60 includes a distal seal ring 67 and a proximal seal ring 65 both providing liquid sealing between the passageway 68 and the member 70. The grooves 71 extend axially between the proximal seal ring 65 and the distal seal ring 67 when the member 70 is in the retracted position illustrated in FIG. 1, meaning that the member 70 does not protrude outside the nozzle 44.

Figure 2:
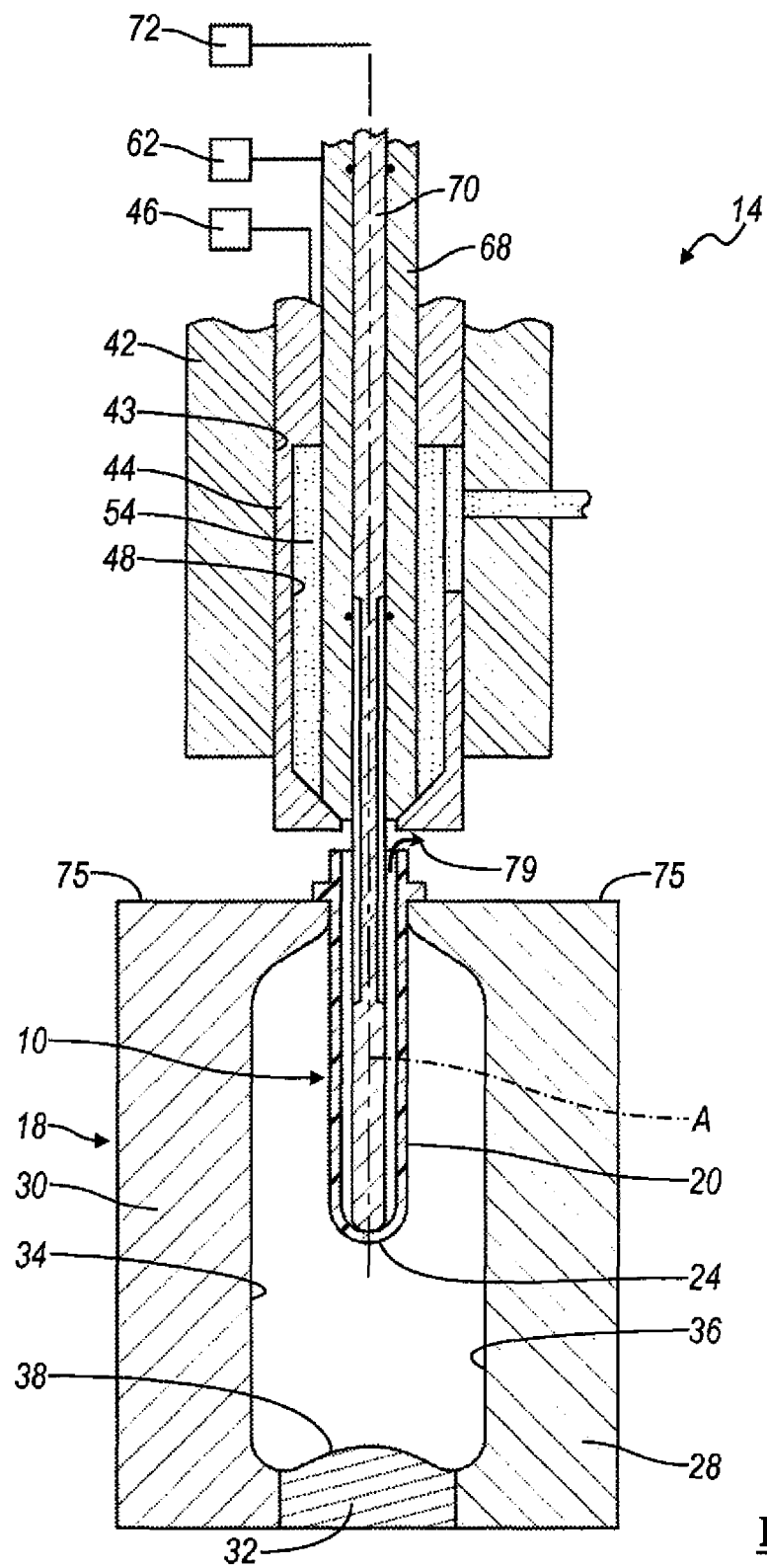

As illustrated in FIG. 2, the hydraulic blow molding device 14 is in an air purging configuration, meaning that the actuator 72 has moved the member 70 down such that the member's distal end reaches the closed end 24 of the preform 10, that the actuator 46 has not moved the nozzle 44 down to the sealing engagement of the nozzle 44 with the preform 10, and that the actuator 62 has maintained the seal pin 60 in a closed state where the head 63 of the seal pin 60 tightly seals the sealing ring 64 of the nozzle 44. In the air purging configuration, the inner volume of the preform 10 communicates with the outside atmosphere and the liquid is prevented from dropping into the preform 10. As the member 70 initiates its advancement into the preform prior to the time of sealing engagement of the blow nozzle 44 with the preform 10, air is moved out of the inner volume of the preform as illustrated by the arrow 76. The volume of air expelled from the preform 10 is equal to the volume of the member 70 that has entered into the preform 10.

As illustrated in FIG. 2, the air purging configuration includes advantageously, but not necessarily, that the actuator 46 has started to move the nozzle 44 towards the preform 10, without reaching the open end 74 of the preform 10. By this way, expelling air out of the preform occurs simultaneously with the preliminary portion of the connecting movement of nozzle 44 with the preform 10. This provides a reduction of air inside the preform without increasing the cycle time of the hydraulic blow forming process.

In a non-illustrated variant, the air purge configuration may be provided with a position of the member 70 inside the preform 10 which does not touch the closed end 24 of the preform 10.

In another non-illustrated variant, the member 70 is a stretch rod 70 and the air purge configuration includes a position of the stretch rod 70 having already started to axially stretch the preform 10. That variant increases the proportion of air expelled out of the preform 10 because during the beginning of the mechanical stretch by the stretch rod 70, the wall of the preform radially retracts inward toward the stretch rod 70. Advantageously, the hydraulic blow molding device 14 moves to an injection configuration illustrated in FIG. 3 before the wall of the preform 10 touches the stretch rod.

Figure 3:
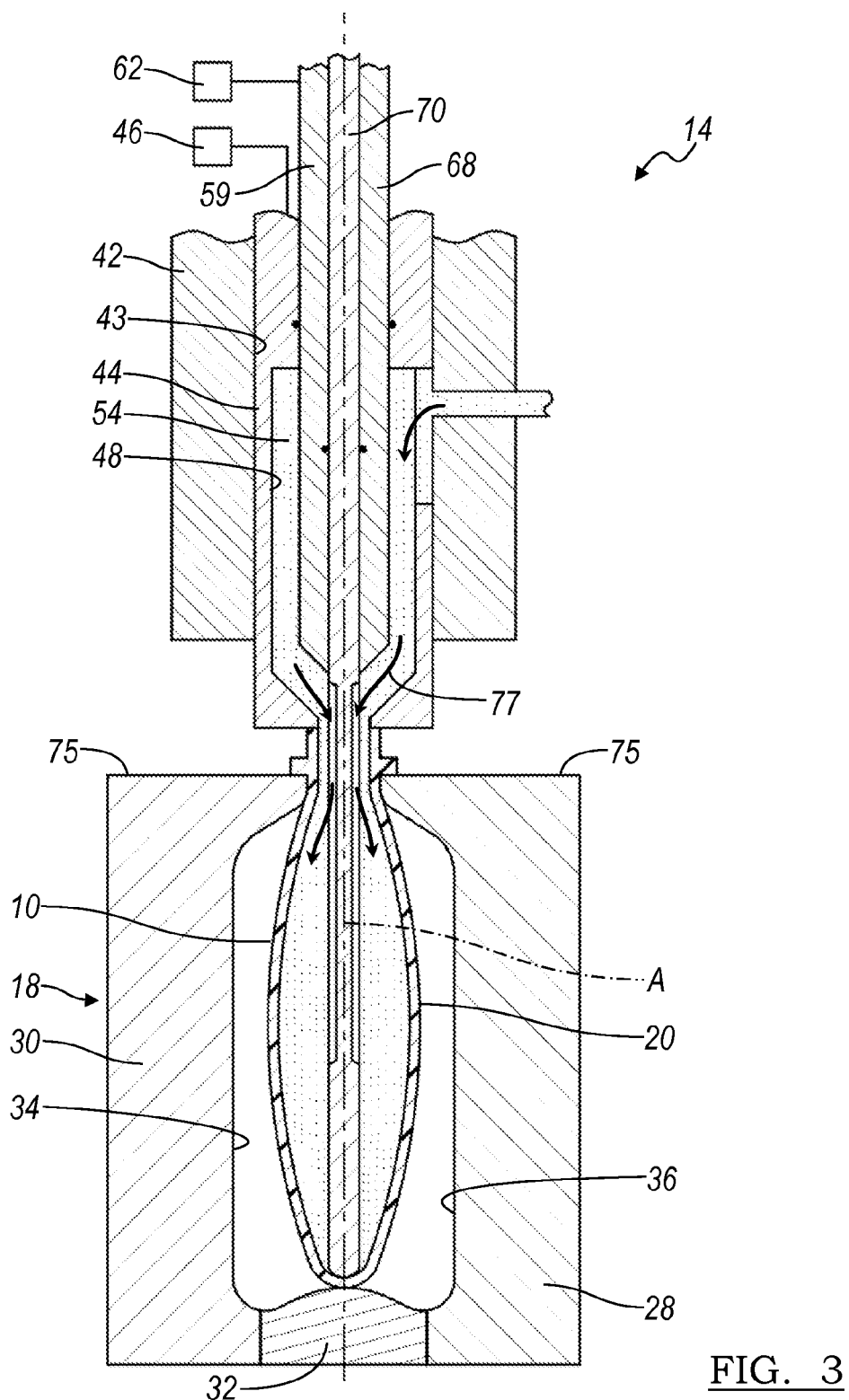

The hydraulic blow molding device 14 illustrated in FIG. 3 is in an injection configuration, meaning that the actuator 46 has engaged the blow nozzle 44 in liquid tight communication with the open end 74 of the preform, followed by the action of the actuator 62 opening the seal pin 60 with respect to the nozzle 44 to allow the liquid to flow between the sealing ring 64 and the head 63, and then to flow through the grooves 71, as illustrated by the arrow 77.

Figure 4:
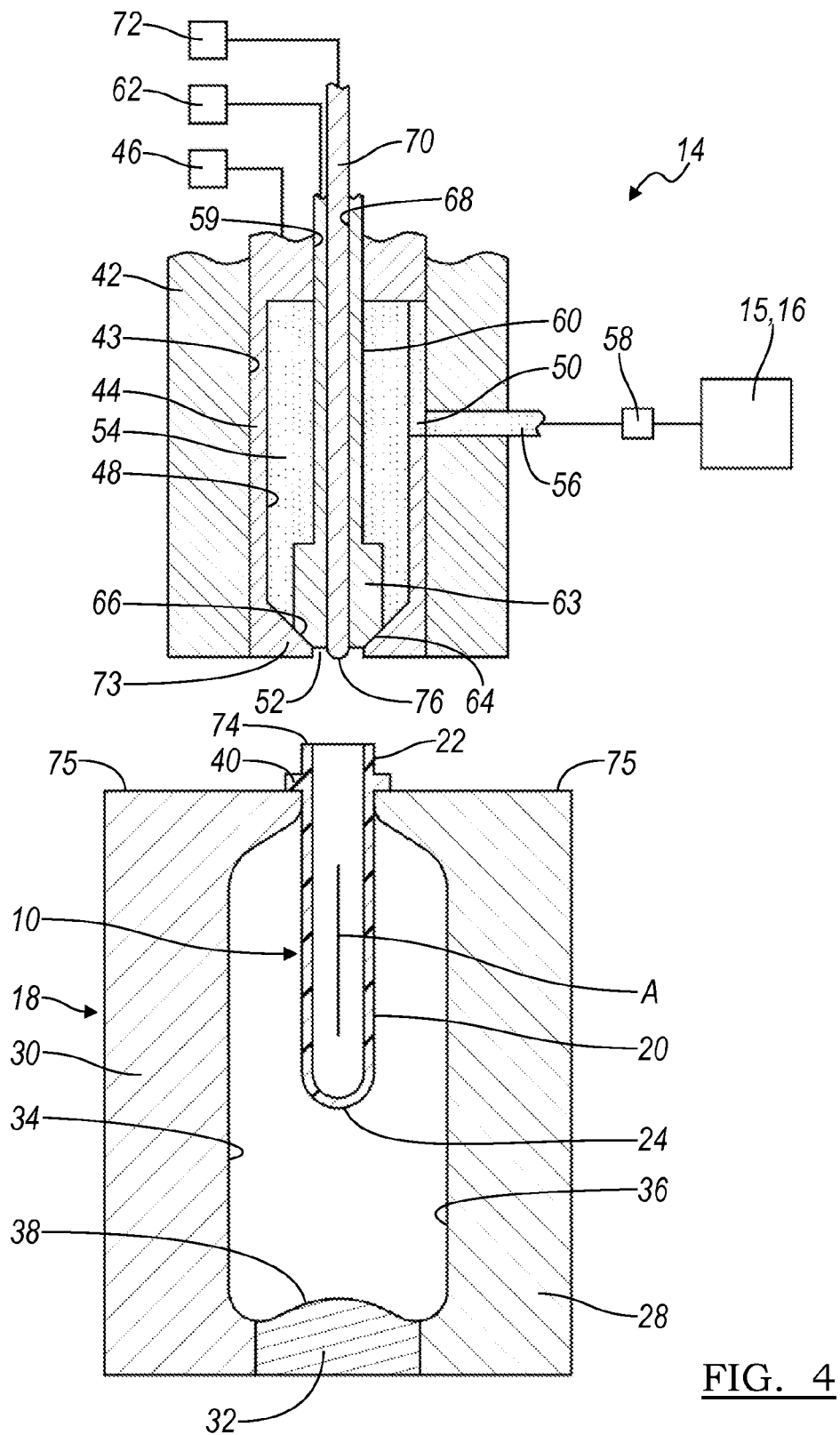
FIG. 4 is a schematic illustration of a hydraulic blow molding device, a mold and a preform carried within the mold used for the method according to a second aspect of the invention.

In a non-illustrated variant, the intermediate axial portion of the member 70 may be substantially cylindrical without groove. Liquid flows between the outside diameter of the member 70 and the inside diameter of the preform 10. Shown in FIGS. 4-15 is another aspect of the invention. As illustrated in FIG. 4, the seal pin 60 further includes portions defining a central passageway 68 within which a headspace setting member 70 is located. The headspace setting member 70 is extendable, by an actuator 72 (similarly to the previously mentioned actuators 46, 42), out of the seal pin 60, through the outlet 52 of the injection nozzle 44 and into the body 20 of the preform 10. When fully extended, the headspace setting member 70 engages the closed end 24 of the preform 10 and axially stretches the preform 10, as further discussed below.

While not illustrated in the drawings, it will be readily appreciated that the providing of the headspace setting member 70 within the seal pin 60, and likewise the providing of the seal pin 60 within the injection nozzle 44, properly includes seals between the various components. The seals are of a variety and construction that will prevent the liquid blow medium 16 from flowing between the headspace setting member 70 and the seal pin 60, as well as between the seal pin 60 and the injection nozzle 44.

Figure 14:
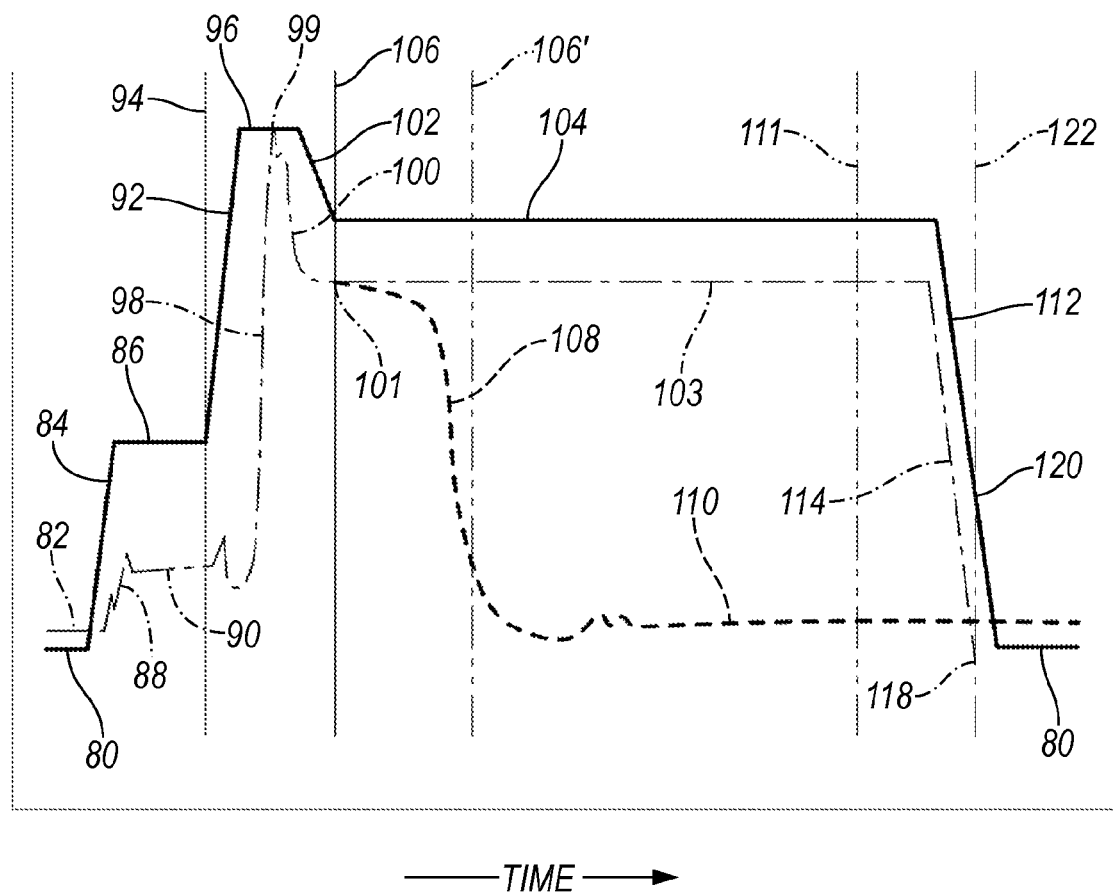
FIG. 14 is a diagram showing the relationship between movement of the stretch rod, pressure applied to the preform, and the opening/closing of the seal pin.
Figure 15:
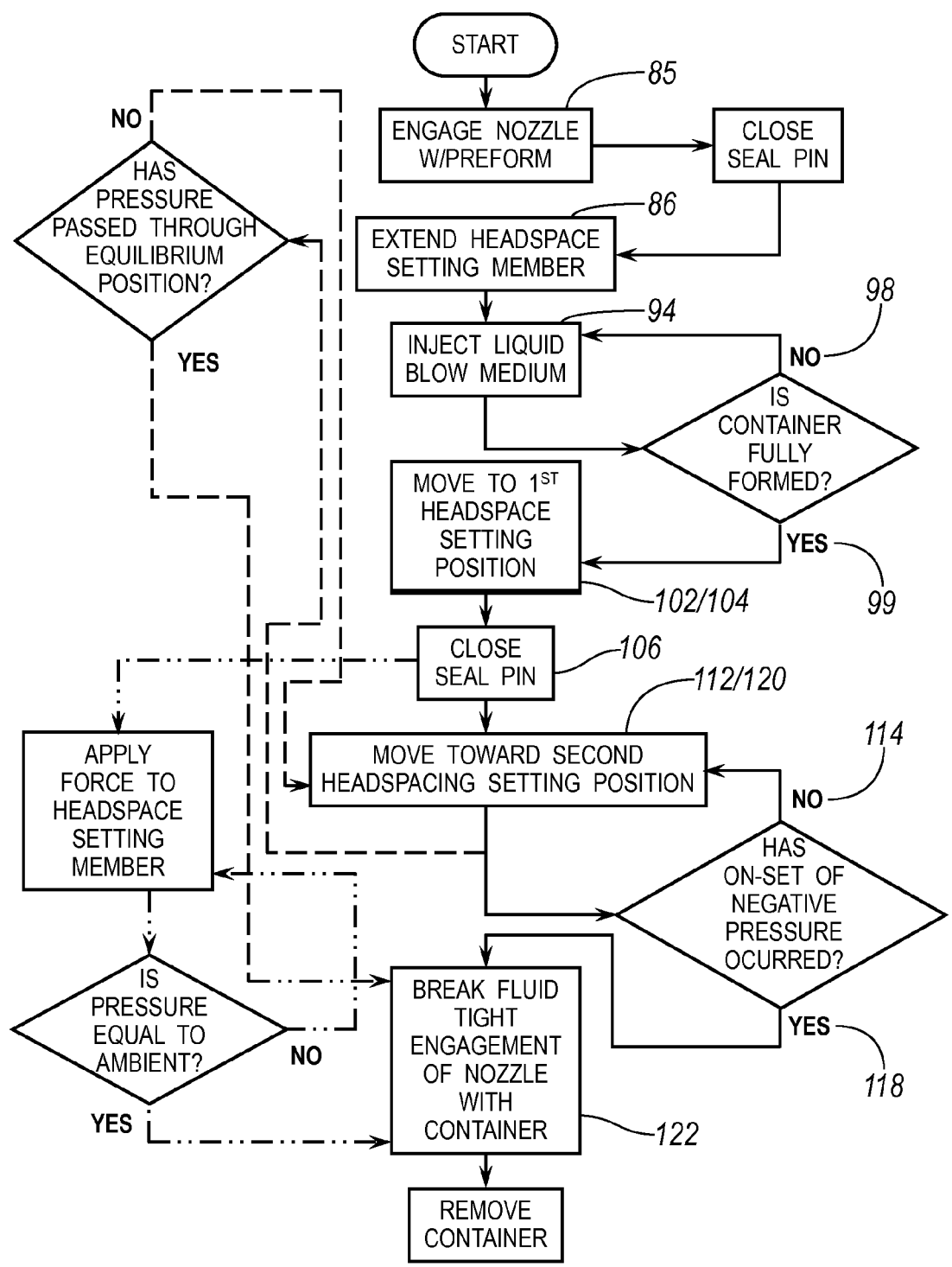
FIG. 15 is a flow chart illustrating the steps of a method for forming and filling a container that incorporates the second aspect of the invention.

In producing a container 12 from a preform 10 with the HBM device 14, the preform 10 is in a first position within the mold 18 and the mold 18 closed so as to retain the preform 10, as seen in FIG. 4. At this point in time, the HBM device 14 is disengaged from the preform 10 and the mold 18, with the injection nozzle 44 and headspace setting member 70 in their retracted positions and with the seal pin 60 in its closed position. Prior to the introduction of the preform 10 into the mold 18, the preform 10 is thermally conditioned or preheated in an oven (not shown) to a temperature suitable for deformation and molding of the preform 10 into the container 12. The thermal conditioning of the preform 10 and the oven are both conventional and therefore are not discussed in greater detail. Since the pressurization device 58 has supplied the liquid blow medium 16 from the source 15 during a prior molding cycle, the central passageway 48 through the injection nozzle 44 is filled with the liquid blow medium 16. As depicted in the diagram of FIG. 14, the headspace setting member 70, which is indicated by the bold or heavy weight line, is in a fully retracted position at 80 and pressure within the preform 10, as indicated by the non-bold or normal weight line, is at an ambient or base pressure 82.

Figure 5:
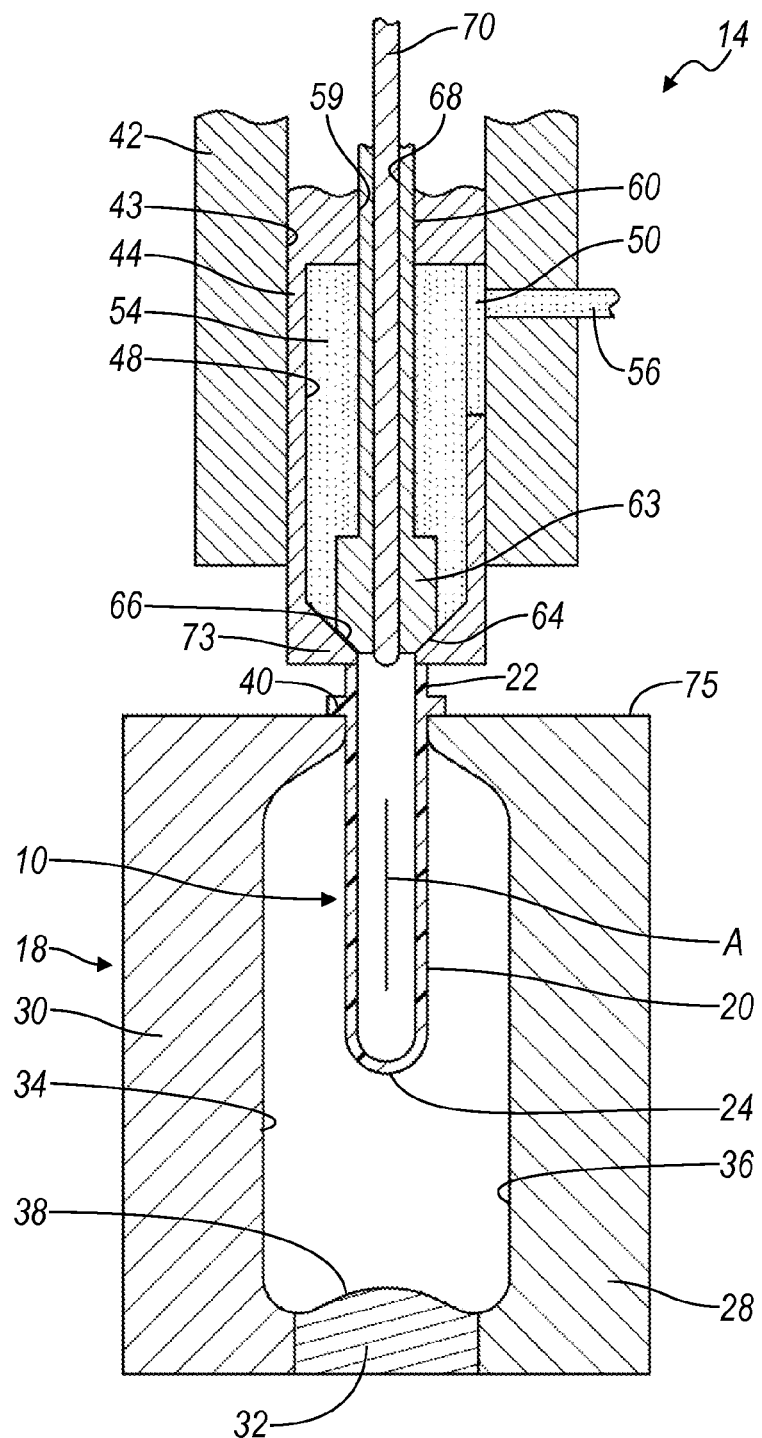
FIGS. 5-13 are schematic illustrations, similar to FIG. 4, of the hydraulic blow molding device and mold at various stages during molding of the preform and filling of the container.

Once the mold 18 has been closed and the preform 10 has been properly positioned beneath the HBM device 14, the injection nozzle 44 is extended (at 85 in FIG. 15) by its actuator 46 to sealingly engage the preform 10. As seen in FIG. 5, the end 73 of the injection nozzle 44 engages the top surface 74 of the preform 10 to establish the sealed engagement. While in the illustrated embodiment the top surface 74 is engaged by the end 73 of the injection nozzle 44, portions of the injection nozzle 44 could alternatively also engage the support ring 40 of the preform 10 and/or the upper surfaces 75 of the mold 18.

Figure 6:
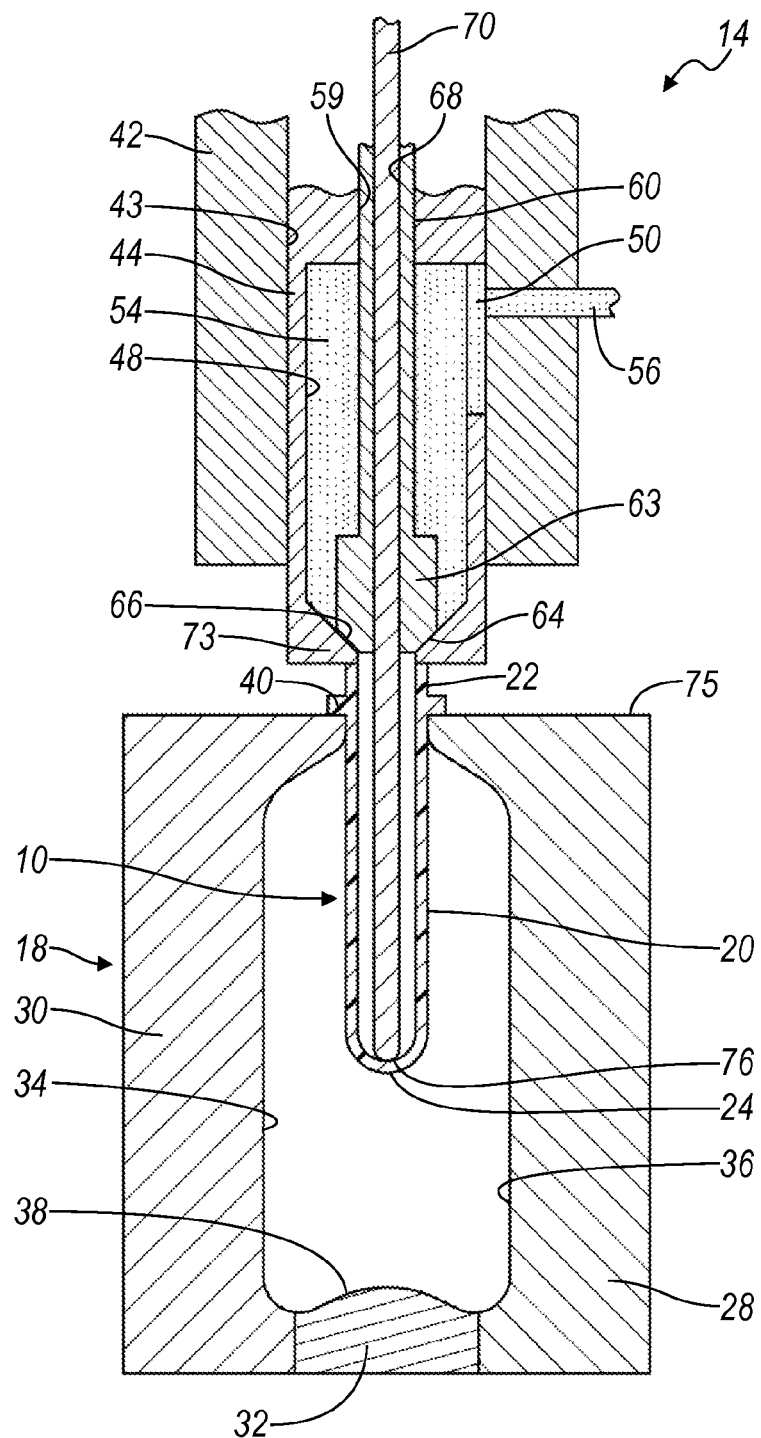

While not illustrated as such in FIG. 5, the headspace setting member 70 may have initiated its advancement into the preform 10 prior to or at the time of sealing engagement of the injection nozzle 44 with the preform 10. When the stretch rod 70 enters into the preform 10 prior to said sealing engagement, some of the air previously inside the preform 10 is expelled out of the preform because the inside volume of the preform is still in communication with the outside atmosphere and the pressure inside the preform does not increase. Engaging the blow nozzle 44 with the preform 10, the interior of the preform 10 is closed defining a preform inner volume. Then, the actuator 72 can further move the stretch rod 70 down to axially stretch the preform 70, and/or the actuator 62 can open the seal pin 63. Both movements can be independent, one starting before the other or vice versa up to a configuration illustrated in FIG. 7. The advantage of initiating advancement of the stretch rod or any member into the preform 10 before sealingly engaging the nozzle with the preform 10 is to reduce or to almost suppress the amount of air inside the preform before the introduction of liquid into the preform. This reduces the oxygen dissolved into the liquid during expansion of the preform into a container by the liquid pressure. This may be beneficial for forming and filling a container with sensitive product like fruit juices. Alternatively, the stretch rod may have initiated its advancement into the preform 10 at the time of sealing engagement of the blow nozzle 44 with the preform 10. As seen in FIG. 6, the headspace setting member 70 has been partially advanced by its actuator 72 so that the distal end 76 of the headspace setting member 70 engages the closed end 24 of the preform 10. The initial advancing of the stretch rod is designated in FIG. 14 at 84 and its engagement with the closed end 24 of the preform 10 is designated at 86. Since the interior of the preform 10 defines a close volume once the injection nozzle 44 has been sealingly engaged with it, during the initial advancement of the headspace setting member 70, air trapped within the preform 10 is compressed and the pressure within the preform 10 increases at 88 and will stabilize at 90 if the headspace setting member 70 stops advancing, as indicated at 86.

After the headspace setting member 70 has engaged the closed end 24 of the preform 10, the headspace setting member 70 is further advanced so as to axially stretch the preform 10. In this regard, it will be appreciated that the headspace setting member 70 may be a stretch rod.

Figure 7:
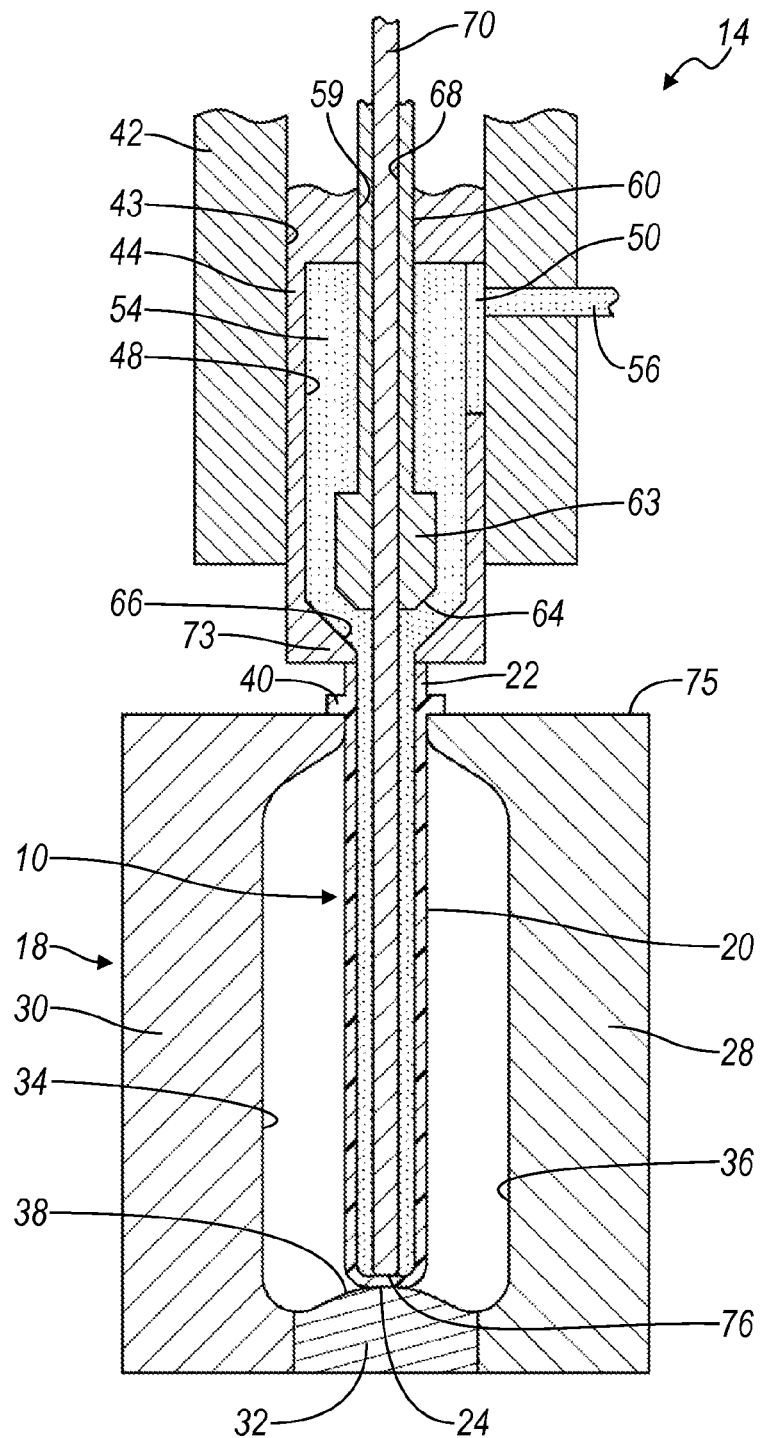

As seen in FIG. 7, the headspace setting member 70 may axially stretch and deform the preform 10 until the closed end 24 of the preform 10 is impinged against the bottom surface 38 of the cavity 26, as defined by the base mold 32. This fully extended position, designated at 96, corresponds with the bottom of the container 12 once formed.

With the advancement of the headspace setting member 70, the seal pin 60 is opened, i.e. moved to its retracted position. The opening of the seal pin 60, which is designated in FIG. 14 at 94, allows the liquid blow medium 16 to initially enter into the preform 10 and operates to maintain the stretched body 20 of the preform 10 in spaced relationship from the headspace setting member 70. At this time, the liquid blow medium 16 may also initially begin to radially expand the body 20 of the preform 10. Radial expansion of the preform 10, however, is not illustrated in FIG. 7. The internal pressure within the preform 10 may spike and then drop, as a result the increased internal volume resulting from axial stretching. Alternatively, the seal pin 60 may remain closed until the headspace setting member 70 is in the fully extended position 96.

Figure 8:
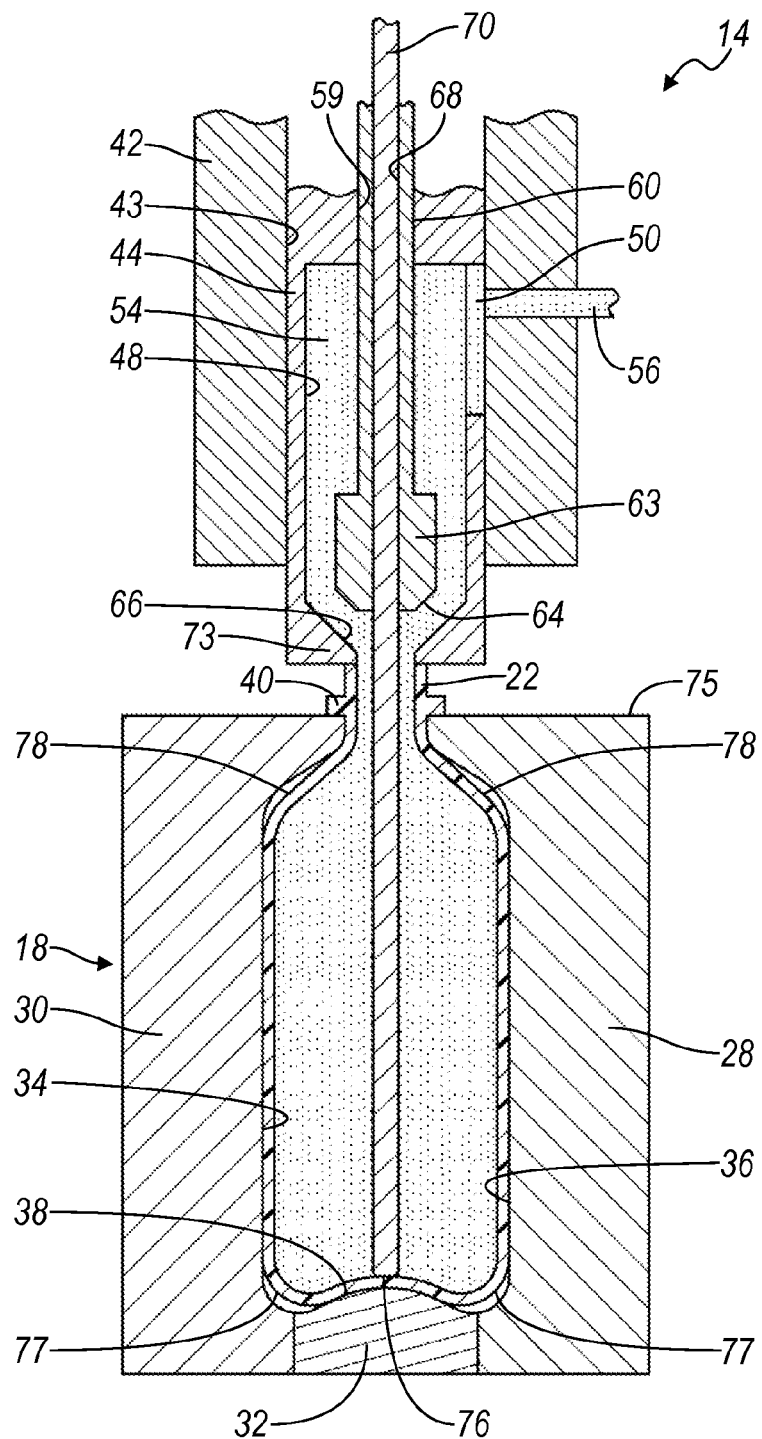
Figure 9:
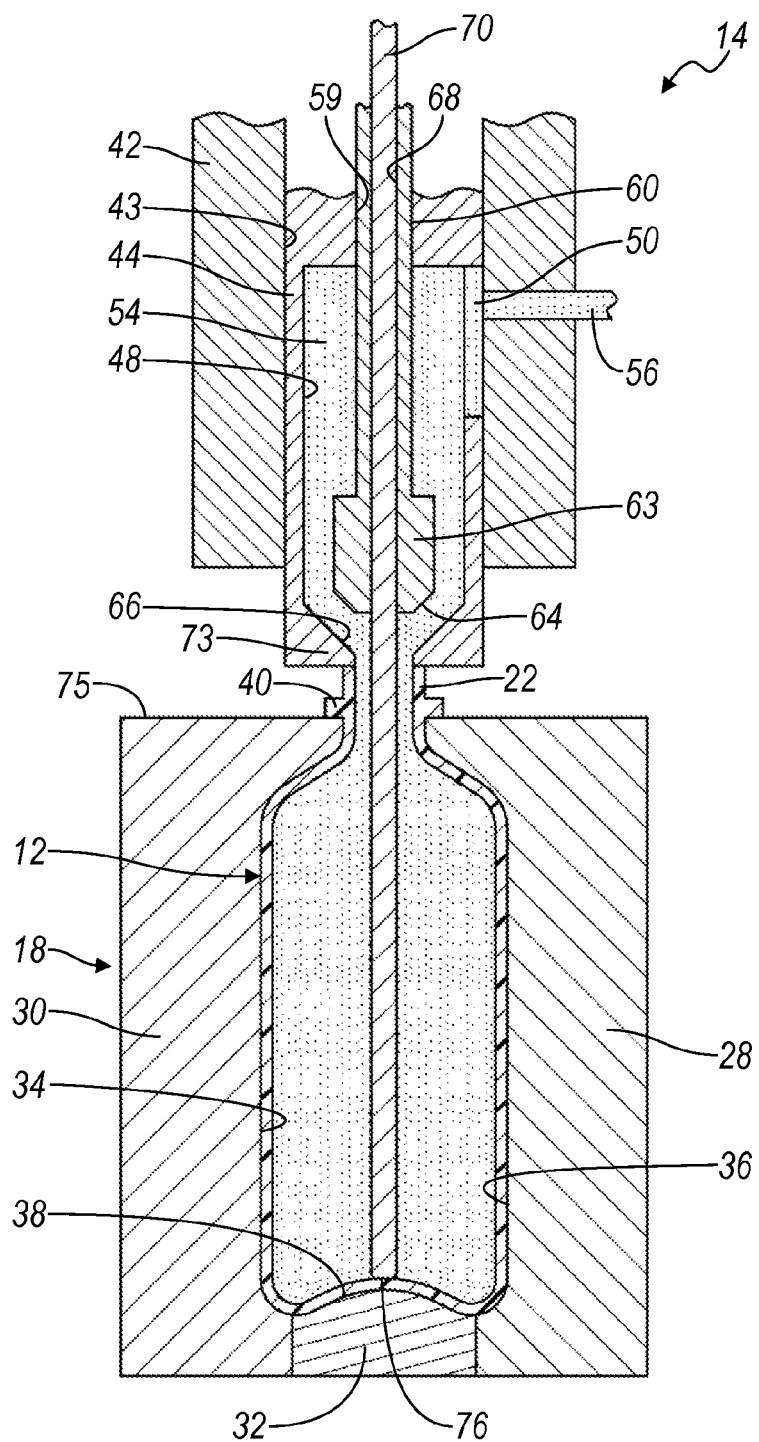

After the headspace setting member 70 has been fully extended and the preform 10 fully axially stretched, the pressurization device 58 increases the system pressure (designated at 98) and causes liquid blow medium 16 to be injected into the preform 10 in a manner that induces radial expansion of the preform 10. However, the lower corners 77 and upper shoulders 78 of the container 12 may not be fully formed, as seen in FIG. 8. The injection of the liquid blow medium 16 continues to significantly increase the system pressure until the total system pressure reaches a peak pressure 99, which is preferably in the range of greater than 40 and up to about 80 bar (about 580 to 1160 psi). The peak pressure 99 causes radial expansion of the body 20 of the preform 10 into substantial conformity with the surfaces 34, 36, 38 defining the cavity 26, thereby fully forming the container 12, as illustrated in FIG. 9. At the peak pressure 99, the air trapped within the container 12 has been cooled and pressurized by the liquid blow medium 16 and may have completely dissolved into the liquid blow medium 16.

After the peak pressure 99 has been applied and the preform 10 has taken the final shape of the container 12, the system begins to depressurize at 100. If the liquid blow medium 16 was injected into the preform 10 at an elevated temperature, such as during a hot fill process (i.e. a liquid blow medium 16 temperature of between about 85° C. and 95° C. (about 185° F. to 195° F.)), the container's material may be at a temperature that is too hot to retain its shape if it is immediately removed from the mold 18. In such instances, a holding pressure 101 may be applied to the container 12, while the container 12 is still in the mold 18 and until the material of the container 12 sufficiently cools to allow it to be removed from the mold 18. The holding pressure (designated in FIG. 14) is reduced from the peak pressure 99 and is preferably in the range of about 40 to 10 bar (about 580 to 145 psi). It is noted that the holding pressure 101 may slightly decrease over time as both the temperature of the material forming the container 12 and the temperature of the liquid blow medium 16 within the container 12 cools.

FIG. 14 illustrates the current method with the incorporation of a holding pressure 101 in the diagram. In non-hot fill applications, those with the liquid blow medium 16 at temperatures in the range of about 0° C. to 32° C. (32° F. to 90° F.), the line showing the depressurization of the container and system would generally continue decrease to about the level at line 110 and not level out at the holding pressure 101.

Figure 10:
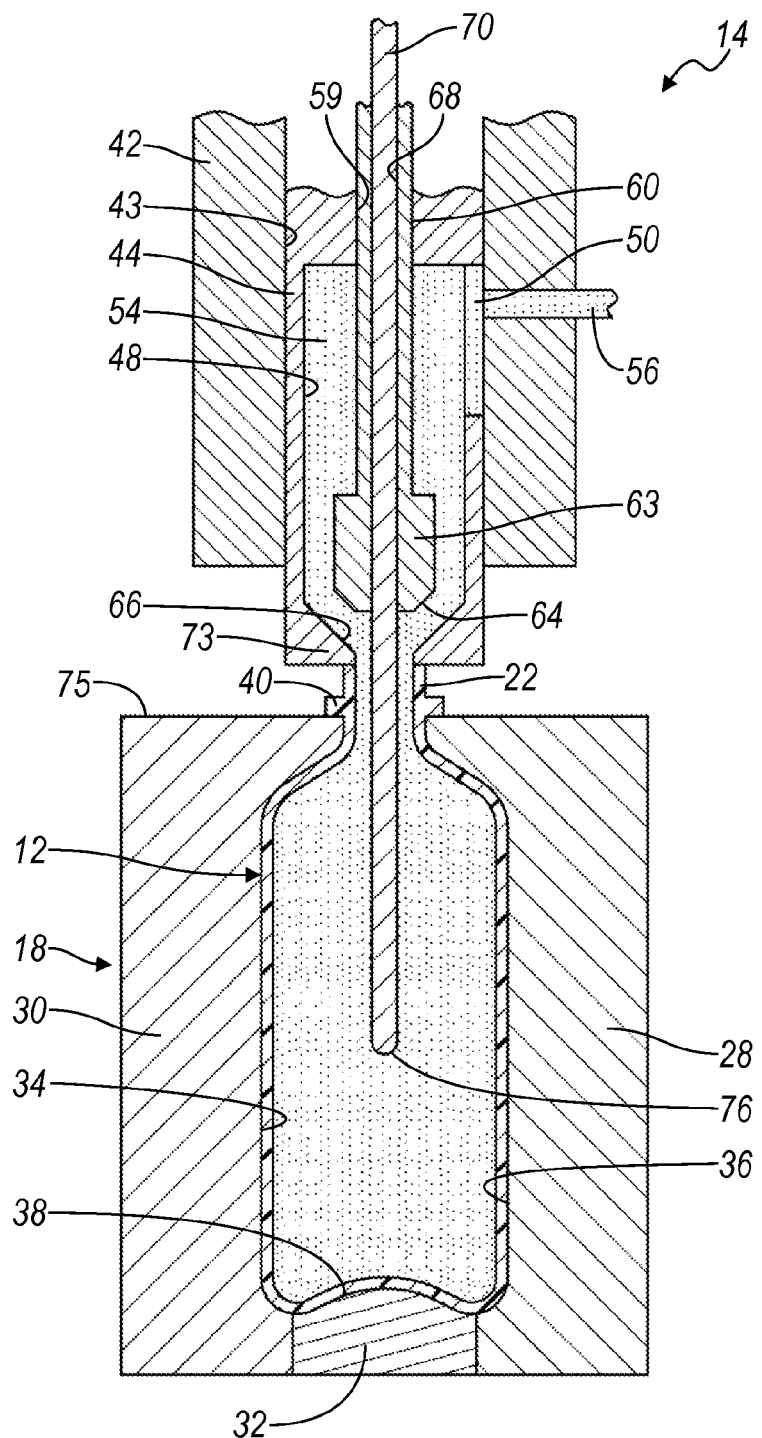

With the pressure within the container 12 is being reduced or while the container 12 is at the holding pressure 100, the headspace setting member 70 is retracted (at 102 in FIG. 14) to a first headspace setting position 104 within the container 12. The first headspace setting position 104 is seen in FIG. 10 and is also designated at 104 in FIG. 14. By retracting the headspace setting member 70 to this position, the volume occupied by the headspace setting member 70 within the liquid blow medium 16 can be used to set the headspace or final liquid fill level 114 within the container 12. This occurs because the level of the liquid within the container 12 will drop proportionally to the volume occupied by the headspace setting member 70 upon the complete removal of the headspace setting member 70 at the end of the molding process.

Figure 11:
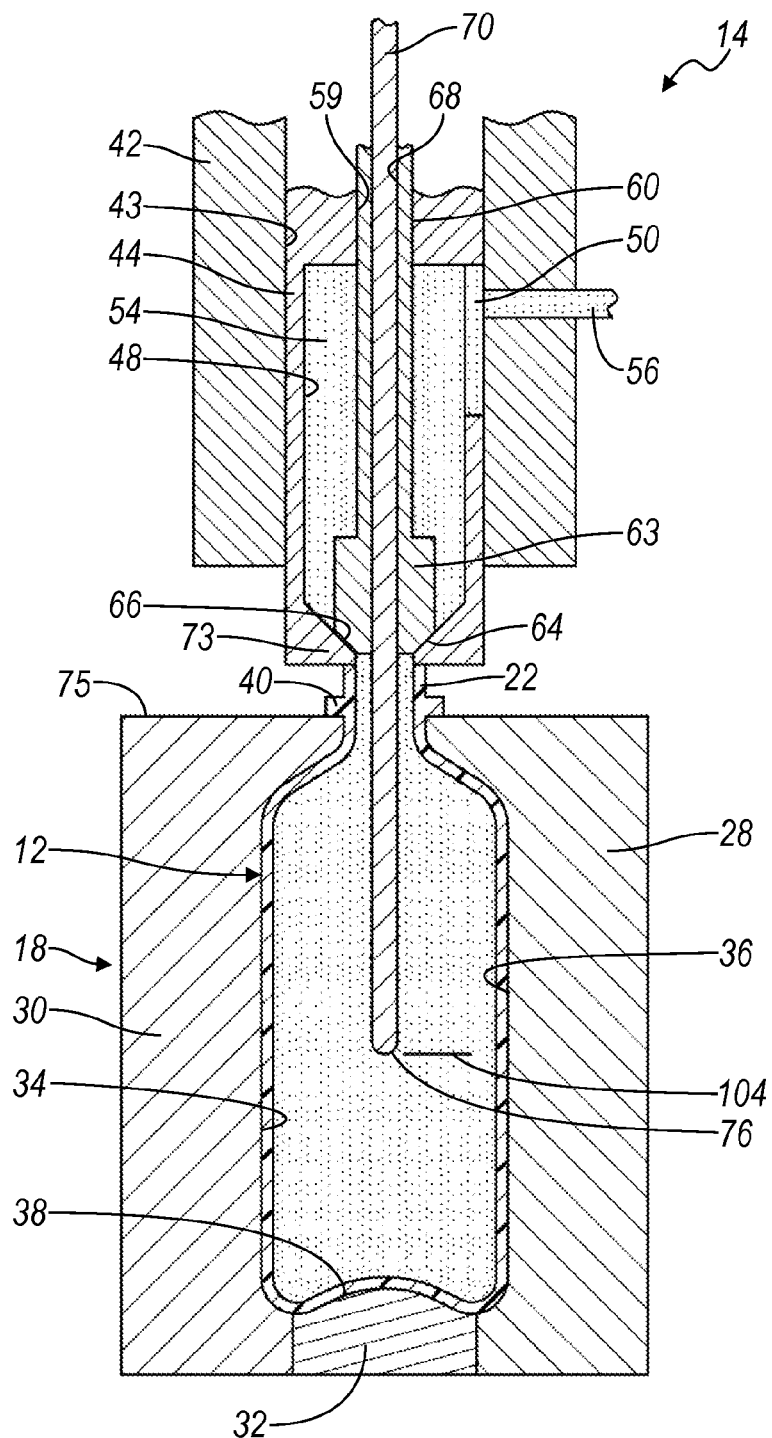

Once the headspace setting member 70 has been retracted to the first headspace setting position 104, and while the system and container pressure is still elevated, in the range of about 40 to 10 bar (about 580 to 145 psi), the seal pin 60 is moved to its closed position (which designated at 106 in FIG. 14), as seen in FIG. 11. The closed position 106 is achieved by the actuator 62 advancing the seal pin 60 so that the sealing ring 64 engages the sealing seat 66 of the injection nozzle 44. This stops the flow of liquid blow medium 16 into the container 12 and isolates the container pressure (designated by solid line 103 in FIG. 14) from the system pressure (dashed line 108, 110 in FIG. 14). The pressure at which the seal pin 60 is closed is hereinafter referred to as the closing pressure. Closing of the seal pin 60 at the higher end of the elevated pressure range is indicated by line 106. Closing the seal pin 60 at the lower end of the elevated pressure range is indicated by dashed line 106'. If the container 12 is being held at the holding pressure 100 during the closing of the seal pin 60, the pressure within the retained volume of the container 12 will the same as the holding pressure 100.

With the seal pin 60 closed, the system pressure may be further depressurized, designated at 108 in FIG. 14, to an ambient or base system pressure 110. Traditionally, the seal pin 60 is not closed until the system/container pressure has been reduced to the ambient or base pressure 110. Traditional closing of the seal pin 60 is generally designated by the dashed line 111 of FIG. 14.

With the seal pin 60 in its closed position 106 and the container pressure 103 at a pressure above ambient or the base system pressure 110, preferably in the range of 40 to 10 bar (about 580 to 145 psi), a retraction force is applied to the headspace setting member 70 causing the headspace setting member 70 to be retracted (designated at 112 in FIG. 14). Since the volume within the container 12 is sealed, as the headspace setting member 70 is retracted, the volume in the container 12 is reduced and the pressure within the container 12 is correspondingly reduced (designated at 114 in FIG. 14).

Figure 12:
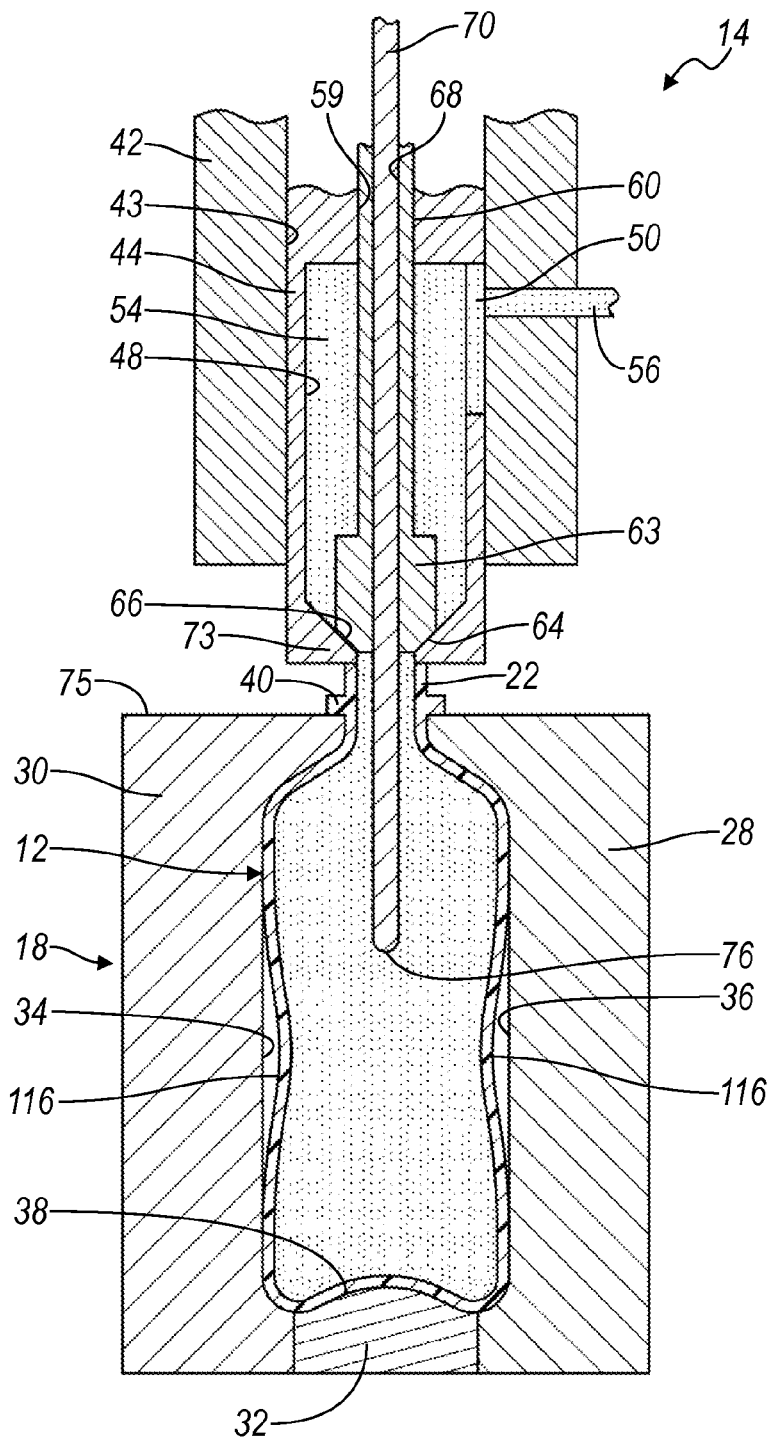

At some point during the retraction of the headspace setting member 70, the pressure within the container 12 will turn negative (be less than ambient pressure). At a certain level, the negative pressure may be sufficient to cause the sidewalls 116 of the container 12 to slightly deform inwardly. This inward deformation of the sidewalls 116 is generally illustrated in FIG. 12. If the inward deflection is a result of a greater than 7% volume reduction, the container 12 may be permanently deformed. This 7% volume reduction is generally considered to be the safe limit of volume reduction, but permanent deformation may occur at higher or lower levels of volume reduction.

To avoid permanent deformation, at the on-set of negative pressure (pressure below ambient pressure) within the container 12, designated at 118 in FIG. 14, the headspace setting member 70 has reached a second headspace setting position 120, which is closer to the finish 22 of the container 12 than the first headspace setting position 104. Synchronized therewith, the injection nozzle 44 is retracted by its actuator 46, thereby breaking the fluid tight engagement between the distal end 73 of the nozzle and the top surface 74 of the container 12. The breaking of the fluid tight engagement is generally designated by the dashed line 122 in FIG. 14 and the pressure at which it occurs is generally referred to the disengaging pressure. Preferably, the disengaging pressure is below ambient and immediately after the on-set of negative pressure, more preferably in the range of −0.1 to −0.5 bar.

Figure 13:
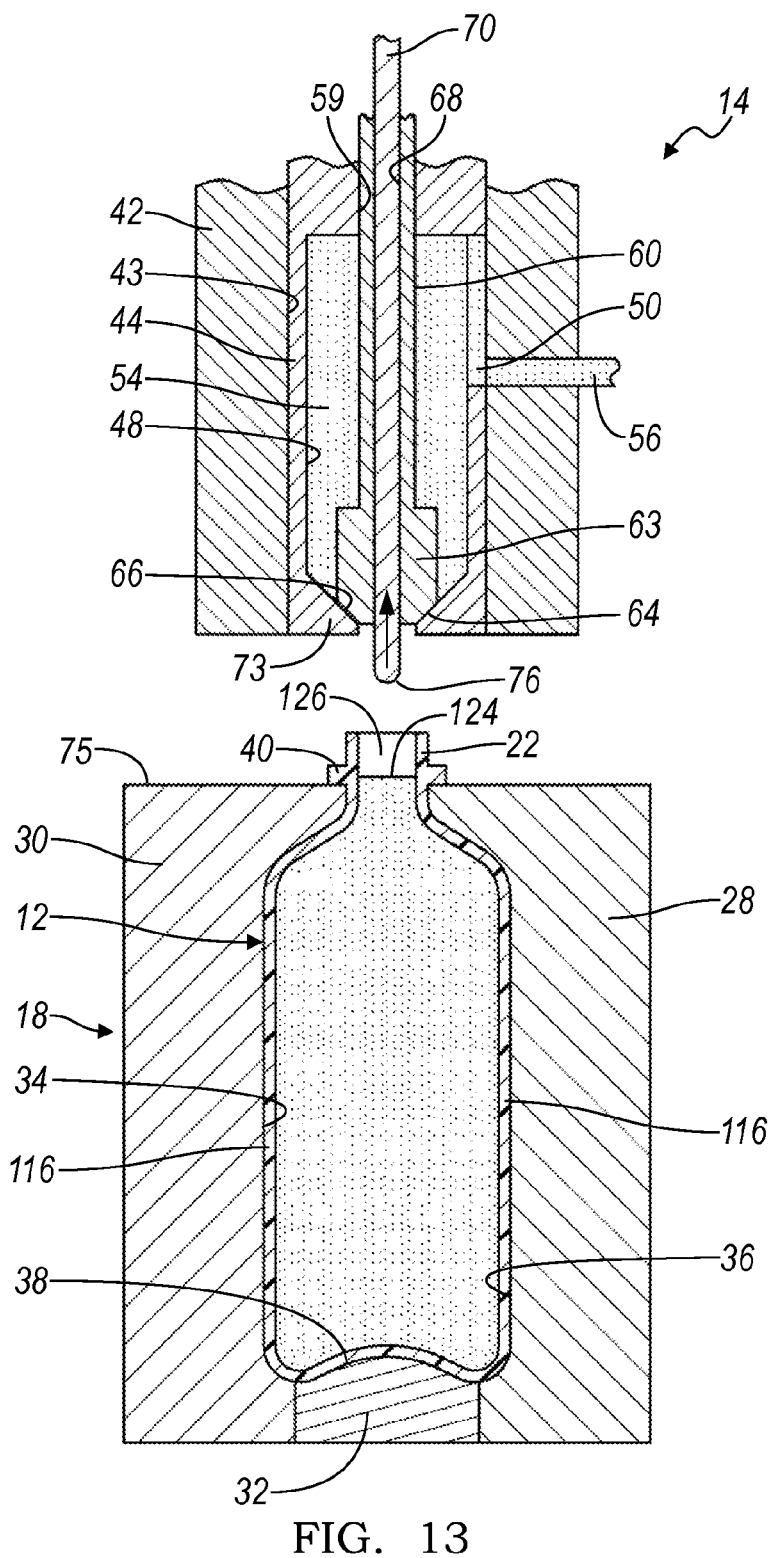

With the breaking of the fluid tight engagement between the injection nozzle 44 and the top surface 74 of the container 12, pressure immediately increases in the container 12 and the side walls 116 return to their non-deformed position, thereby increasing the volume of the container 12. The increase in volume has the effect to immediately reduce the level of the liquid blow medium 16 and prevent the liquid blow medium 16 from being expelled out of the container 12. The level of the liquid blow medium 16 within the container 12 will immediately drop from the top surface 74, where the level was at time when the seal pin 60 closed. Upon full removal of the headspace setting member 70 from the container 12, as seen in FIG. 13, the level of the liquid blow medium 16 will drop to a final liquid level 124 which defines the desired headspace 126. Typically, the final liquid level 124 is at or adjacent to the support ring 40.

In another embodiment, as the headspace setting member (70) moves from the first headspace setting position (104) to the second headspace setting position (120), it passes through an equilibrium position wherein the pressure inside the container (12) is equal to the ambient pressure. The volume of the liquid corresponding to the change in volume as the headspace setting member (70) in the equilibrium position moves to the second headspace setting position (120) is greater than or equal to the volume of liquid existing between the closed seal pin (60) and lowermost extent of the preform finish (22). This change in volume ensures that any drops of liquid on the bottom of the injection nozzle (44), which would generally be located between the closed seal pin (60) and the finish (22) when the injection nozzle disengages from the container (12), will be drawn down into the container (12) when the injection nozzle (44) disengages from the container (12). Accordingly, in this embodiment, the disengaging pressure (122) at the second headspace setting position is a pressure that is lower-than-ambient pressure.

In yet another embodiment, a force exerted on the headspace setting member (70) is such that the disengaging pressure (122) is equal to the ambient pressure. The force applied to the headspace setting member (70) moves the headspace setting member (70) from the first headspace setting position (104) to the equilibrium position. Due to the non-compressibility of the liquid and the high rigidity of the molding cavity, the travel distance of the headspace setting member (70) may be very small, but is not null, because of the residual elasticity of the mold cavity, including but not limited to the mold locking mechanism. However, one advantageous way for this embodiment to control the stopping of the headspace setting member (70) at the equilibrium position is to use a headspace setting member (70) having a stress sensor or a pressure sensor for measuring the pressure inside the container (22), or the force exerted on the headspace setting member (70). Accordingly, in this embodiment, the disengaging pressure (122) at the equilibrium position is at a pressure which is equal-to-ambient pressure.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A method for forming and filling a container with liquid, the container being formed from a preform located within a mold and the method utilizing a hydraulic blow molding device that is coupled to a source of the liquid, which is used as the blow molding medium, the hydraulic blow molding device having a blow nozzle, a seal pin and a member, the method comprising:
   advancing the member from a retracted position to a position within the preform;
   after the member has initiated advancement into the preform, engaging the blow nozzle in fluid tight communication with an open end of the preform as to provide a sealing engagement of the blow nozzle with the preform; and
   opening the seal pin and injecting the liquid blow medium into the preform so as to form the container after the sealing engagement of the blow nozzle with the preform;
   during injection of the liquid blow medium, retracting the member to a first headspace position;
   with the member in the first headspace position, closing the seal pin after forming the container;
   after closing the seal pin, moving the member to a second headspace position, the second headspace position being closer to the finish than the first headspace setting position and reducing pressure within the formed container to ambient; and
   with the member in the second headspace position, breaking sealing engagement of the blow nozzle.

2. The method of claim 1, comprising extending the member from the retracted position to an engagement position where the member engages a closed end of the preform.

3. The method of claim 1, wherein the volume of the member into the preform at the time of sealing engagement of the blow nozzle with the preform is greater than 80% of the inner volume of the preform.

4. The method of claim 1, wherein the member is a stretch rod, the method further comprising the step of axially stretching the preform by extending the stretch rod.

5. The method of claim 4, including extending the stretch rod from the retracted position to a position wherein the stretch rod extends the preform before the time of sealing engagement of the blow nozzle with the preform.

6. A method for forming and filling a container with liquid and setting the headspace of the liquid within the container, the container being formed from a preform located within a mold and the method utilizing a hydraulic blow molding device that is coupled to a source of a liquid blow medium, the hydraulic blow molding device having an injection nozzle, a pressurized liquid source and a headspace setting member, the method comprising:

engaging the injection nozzle in fluid tight engagement with an open end of the preform;
extending the headspace setting member from a retracted position to an extended position within the preform;
injecting the liquid blow medium into the preform under a pressure of the pressurized liquid source so as to form the container;
retracting the headspace setting member from the extended position to a first headspace position within the container;
with the headspace setting member in the first headspace position, establishing a closing pressure of the liquid blow medium inside the formed container that is independent from the pressure of the pressurized liquid source;
breaking the fluid tight engagement by disengaging the injection nozzle from the preform while the pressure inside the container is still independent from the pressure of the pressurized liquid source thereby providing a predetermined final fill level of the liquid within the container,
wherein the closing pressure is different from the ambient pressure and is above the ambient pressure and the method further comprises that after establishing the closing pressure inside the container and before breaking the fluid tight engagement, exerting a force on the headspace setting member after being placed in the first headspace position to reduce the pressure of the liquid blow medium inside the container from the closing pressure to a disengaging pressure that is one of a pressure lower than ambient pressure or a pressure equal to ambient pressure.

7. The method of claim 6, wherein the hydraulic blow molding device further has a seal pin, said establishing a closing pressure of the liquid blow medium inside the formed container that is independent from the pressure of the pressurized liquid source is made by closing the seal pin while the liquid blow medium is at the closing pressure, and/or the pressure inside the container is still independent from the pressure of the pressurized liquid source when the seal pin is still closed.

8. A method for forming and filling a container with liquid and setting the headspace of the liquid within the container, the container being formed from a preform located within a mold and the method utilizing a hydraulic blow molding device that is coupled to a source of a liquid blow medium, the hydraulic blow molding device having an injection nozzle, and a pressurized liquid source, the method comprising:
engaging the injection nozzle in fluid tight engagement with an open end of the preform;
injecting the liquid blow medium into the preform under a pressure of the pressurized liquid source so as to form the container;
establishing a closing pressure of the liquid blow medium inside the formed container that is independent from the pressure of the pressurized liquid source and from ambient pressure;
breaking the fluid tight engagement by disengaging the injection nozzle from the preform while the pressure inside the container is still independent from the pressure of the pressurized liquid source and from ambient pressure thereby providing a predetermined final fill level of the liquid within the container,
wherein the closing pressure is different from the ambient pressure and is above the ambient pressure and the method further comprises that after establishing the closing pressure inside the container and before breaking the fluid tight engagement, reducing the pressure of the liquid blow medium inside the formed container from the closing pressure to a disengaging pressure that is one of a pressure lower than ambient pressure or a pressure equal to ambient pressure, said reducing the pressure taking place while said the pressure of the liquid blow medium inside the formed container is still independent from the pressure of the pressurized liquid source and from ambient pressure.

9. The method of claim 8, wherein the hydraulic blow molding device further has a headspace setting member, said reducing the pressure of the liquid blow medium inside the formed container is made by exerting a force on the headspace setting member.

10. The method of claim 9, wherein the hydraulic blow molding device further has a seal pin, said establishing a closing pressure of the liquid blow medium inside the formed container that is independent from the pressure of the pressurized liquid source is made by closing the seal pin while the liquid blow medium is at the closing pressure, and/or the pressure inside the container is still independent from the pressure of the pressurized liquid source when the seal pin is still closed.

11. The method of claim 9, wherein said reducing the pressure of the liquid blow medium inside the formed container is made by: positioning the headspace setting member at a first headspace position within the container prior said establishing a closing pressure of the liquid blow medium inside the formed container that is independent from the pressure of the pressurized liquid source; and by, further retracting the headspace setting member from the first headspace setting position to a second headspace position within the preform while the pressure inside the container is still independent from the pressure of the pressurized liquid source.

12. A method for forming and filling a container with liquid and setting the headspace of the liquid within the container, the container being formed from a preform located within a mold and the method utilizing a hydraulic blow molding device that is coupled to a source of a liquid blow medium, the hydraulic blow molding device having an injection nozzle, a headspace setting member and a seal pin, the method comprising:
engaging the injection nozzle in fluid tight engagement with an open end of the preform;
extending the headspace setting member from a retracted position to an extended position within the preform;
injecting the liquid blow medium into the preform so as to form the container;
repositioning the headspace setting member from the extended position to a first headspace position within the container;
closing the seal pin while the liquid blow medium is at a closing pressure;
breaking the fluid tight engagement by disengaging the injection nozzle from the preform while the seal pin is still closed thereby providing a predetermined final fill level of the liquid within the container,
wherein the closing pressure is different from the ambient pressure and is above the ambient pressure and the method further comprises that after closing of the seal pin and before breaking the fluid tight engagement, exerting a force on the headspace setting member in the first headspace setting position to reduce the pressure of the liquid blow medium inside the container from the closing pressure to a disengaging pressure that is one of a pressure lower than ambient pressure or a pressure equal to ambient pressure.

13. The method of claim 12, wherein the exerting of a force on the headspace setting member includes retracting the headspace setting member from a first headspace setting position to a second headspace setting position, the second headspace setting position being closer to the finish than the first headspace setting position.

14. The method of claim 13, wherein the volume of the headspace setting member moving from the first headspace setting position to the second headspace setting position passes through an equilibrium position wherein the pressure inside the container is equal to the ambient pressure, and wherein the volume of the liquid corresponding to the retraction of the headspace setting member from the equilibrium position to the second headspace setting position is greater than or equal to the volume of liquid existing between the closed seal pin and the lower most extend of the preform finish.

15. The method of claim 12, wherein breaking of the fluid tight engagement occurs immediately after on-set of the disengaging pressure.

16. The method of claim 12, wherein breaking of the fluid tight engagement occurs less than 0.05 seconds after on-set of the disengaging pressure.

17. The method of claim 12, wherein the closing pressure is more than 0.3 bar above ambient pressure.

18. The method of claim 12, wherein the step of injecting the liquid blow medium includes increasing pressure within the hydraulic blow molding device up to a peak pressure then reducing the pressure to the closing pressure that is greater than the disengaging pressure.

19. The method of claim 12, wherein the step of injecting the liquid blow medium includes increasing pressure within the container up to a peak pressure then reducing the pressure to a holding pressure that is positive or above ambient pressure.

20. The method of claim 19, wherein the step of positioning the headspace setting member at the first headspace setting position is performed while the container is at the holding pressure.

21. The method of claim 19, wherein the step of positioning the headspace setting member at the first headspace setting position is performed while the container is transitioning from the peak pressure to the holding pressure.

22. The method of claim 12, wherein the closing pressure is equal to the holding pressure.

23. The method of claim 12, wherein the step of injecting the liquid blow medium into the preform is initiated by opening the seal pin.

24. The method of claim 23, wherein the step of extending the headspace setting member from a retracted position to a position within the preform is conducted prior to opening of the seal pin, the position within the preform being an engagement position where the headspace setting member engages a closed end of the preform.

25. The method of claim 24, wherein the step of axially stretching the preform includes extending the preform from the engagement position to a fully extended position corresponding to a bottom surface of the container.

26. The method of claim 25, wherein the first headspace setting position is closer to the opening of the container than to the bottom surface of the container.

27. The method of claim 24, wherein the first headspace setting position is closer to the opening of the container than the engagement position.

28. The method of claim 12, further comprising the step of axially stretching the preform by extending the headspace setting member.

29. The method of claim 12, wherein the headspace setting member is a stretch rod.

30. The method of claim 12, wherein the step of positioning the headspace setting member at the first headspace setting position is performed before the closing of the seal pin.

31. The method of claim 12, wherein said engaging the injection nozzle in fluid tight engagement takes place while the seal pin is closed.

* * * * *